(12) United States Patent
Acar et al.

(10) Patent No.: US 9,768,962 B2
(45) Date of Patent: *Sep. 19, 2017

(54) MINIMAL DISCLOSURE CREDENTIAL VERIFICATION AND REVOCATION

(71) Applicant: MICROSOFT TECHNOLOGY LICENSING, LLC, Redmond, WA (US)

(72) Inventors: Tolga Acar, Sammamish, WA (US); Christian Paquin, Bellevue, WA (US); Duy Lan Nguyen, Redmond, WA (US); Melissa Chase, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/831,581

(22) Filed: Mar. 15, 2013

(65) Prior Publication Data
US 2014/0281525 A1 Sep. 18, 2014

(51) Int. Cl.
*H04L 9/32* (2006.01)
(52) U.S. Cl.
CPC .......... *H04L 9/3226* (2013.01); *H04L 9/3213* (2013.01); *H04L 9/3218* (2013.01)
(58) Field of Classification Search
CPC ....... H04L 9/32; H04L 9/3218; H04L 9/3236; H04L 9/008; H04L 2209/26; H04L 2209/38; H04L 2209/42; H04L 63/0407; H04L 63/0421; H06F 21/6254
USPC .......................... 713/168–179, 193; 726/5, 9
See application file for complete search history.

(56) References Cited

U.S. PATENT DOCUMENTS

2008/0034203 A1* 2/2008 Camnisch et al. ............ 713/156
2012/0023336 A1* 1/2012 Natarajan ..................... 713/179

FOREIGN PATENT DOCUMENTS

WO    WO 2010086802 A1 *  8/2010   ............... H04L 9/32

OTHER PUBLICATIONS

Au et al., "Dynamic universal accumulators for DDH groups and their application to attribute-based anonymous credential systems", Lecture Notes in Computer Science, vol. 5473, pp. 295-308, 2009.*

(Continued)

*Primary Examiner* — Noura Zoubair

(57) ABSTRACT

The subject disclosure is directed towards credential verification for accessing a service provider. A user may prove to the service provider the validity of the credential by communicating a non-revocation component that is based upon a prime-order cryptographic group without a bilinear pairing. In order to authenticate the user, a verification mechanism within an identity management system applies private cryptographic data, including a verifier-designated private key to the non-revocation component, which proves that the user's identity and therefore, the credential is not revoked. The presentation proof includes a hash value that is computed using the credential's commitment and the prime-order cryptographic group. By verifying that the hash value was computed using that commitment, the verification mechanism validates the credential and permits access to the service provider.

20 Claims, 7 Drawing Sheets

(56) References Cited

OTHER PUBLICATIONS

Tzong-Sun Wu and Han-Yu Lin, "A novel probabilistic signature based on bilinear square Diffie-Hellman problem and its extension", Published in Wiley Online Library, Aug. 13, 2012.*

Emura et al "An Anonymous Designated Verifier Signature Scheme with Revocation: How to Protect a Company's Reputation", Lecture Notes in Computer Science, vol. 6402, pp. 184-198, 2010.*

"Second Written Opinion Issued in PCT Patent Application No. PCT/US2014/025120", Mailed Date: Mar. 9, 2015, 9 Pages.

Emura, et al., "A Certificate Revocable Anonymous Authentication Scheme with Designated Verifier", In proceedings of the International Conference on Availability, Reliability and Security, IEEE, Mar. 16, 2009, pp. 769-773.

Au, et al., "Constant-Size Dynamic k-TAA", In Proceedings of the 5th International Conference on Security and Cryptography for Network, Lecture Notes in Computer Science, vol. 4116, 2006, pp. 111-125.

Zhang, et al., "Short Signature and Universal Designated Verifier Signature Without Random Oracles", In Proceedings of the Third International Conference on Applied Cryptography and Network Security, Lecture Notes in Computer Science, vol. 3531, May 5, 2005, pp. 483-498.

International Search Report and Written Opinion received for PCT Patent Application No. PCT/US2014/025120, mailed Jul. 1, 2014, 13 pages.

Camenisch et al., "An Accumulator Based on Bilinear Maps and Efficient Revocation for Anonymous Credentials", Irvine Proceedings of the 12th International Conference on Practice and Theory in Public Key Cryptography: PKC (2009), 25 pages.

Rjasko et al., "On Designated Verifier Signature Schemes", International Association for Cryptologic Research, Jun. 2010, 15 pages.

Lapon et al., "Analysis of Revocation Strategies for Anonymous Idemix Credentials", CMS'11 Proceedings of the 12th IFIP TC 6/TC 11 international conference on Communications and multimedia security, (2011), pp. 3-17.

Li et al., "Universal Accumulators with Efficient Nonmembership Proofs", Applied Cryptography and Network Security, Jun. 5, 2007, 17 pages.

Acar et al., "Accumulators and U-Prove Revocation", Radio Frequency Identification, (Apr. 2013), 8 pages.

* cited by examiner

MINIMAL DISCLOSURE CREDENTIAL VERIFICATION AND REVOCATION

BACKGROUND

Organizations are increasingly looking to securely identify users who access and utilize their services and resources, both on the Internet and offline, while keeping these users' information private from everyone else. These user authentication and data sharing needs are driven by cost and efficiency considerations, by new business models that leverage personal information, and by the explosive rise of phishing, identity theft, and other security threats. Conventional mechanisms for user authentication and data sharing, such as plastic cards and paper certificates, are costly, vulnerable to counterfeiting, and problematic for online use.

As a result, there is a rapidly growing interest in mechanisms (e.g., X.509 certificates) that can be implemented in software and/or hardware and employed to secure monetary or financial transactions over the Internet. However, these mechanisms are limited because, for example, they cannot be used without disclosing at least some information associated with the user. During a verification procedure, in order to determine whether a credential is valid, the user provides at least some identity data in order to be authenticated. In some cases, an issuer may want to stop a particular user from using the credential that has already been issued, such as when the user may be no longer qualified to use previously issued credentials, the attributes contained therein have become temporarily or permanently invalid, or the user violated policies associated with a service provider. For users whose credentials were not revoked, therefore, proving validity cannot be accomplished without disclosing private and/or confidential information in the form of one or more attributes. This is because the attributes themselves are used to keep track of revoked credentials.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards proving a minimal disclosure credential's validity/non-revocation without disclosing identifying information about the credential and/or the credential's user(s). In one aspect, a non-revocation component, which may be herein referred to as a verifiable signature or presentation proof, validates the credential by verifying that some entity/authority has not revoked that credential. These credentials may be herein referred to by many terms, such as minimal disclosure credentials, security tokens, privacy protecting tokens, anonymous credentials and/or the like. As described herein, minimal disclosure credential-based identity management systems allow the user to prove the credential is not revoked without revealing any private information, such as the user's identity.

In one aspect, the credential includes an undisclosed attribute embedded therein that corresponds to the user's identity. By applying a verifier-designated private key to a non-revocation proof corresponding to this undisclosed attribute, a verifier component within an identity management system determines whether or not the non-revocation proof was generated from an accurate and an up to date accumulator representing revoked credentials of a blacklist or valid credentials of a whitelist. In another aspect, a verifier-generated challenge is signed by the user with the credential's private key and returned to the verifier for verification. In yet another aspect, a revocation authority updates the accumulator for such systems since disputes, mistakes, identity changes, intrusions and/or the like may render any credential invalid before its expiration.

In one aspect, an identity management system implements credential verification/revocation as part of a cloud-based service, infrastructure, and/or platform. In one aspect, the identity management system provides issuance, verification and/or revocation related services involving accumulators. In one aspect, if the accumulator is generated using the credential's undisclosed attribute information (e.g., a unique user identifier) and private cryptographic data, non-membership or membership in the blacklist or the whitelist may be determined using that private cryptographic data instead of the attribute's value. In one aspect, the private cryptographic data enables credential authentication while allowing the user to remain anonymous as described herein.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
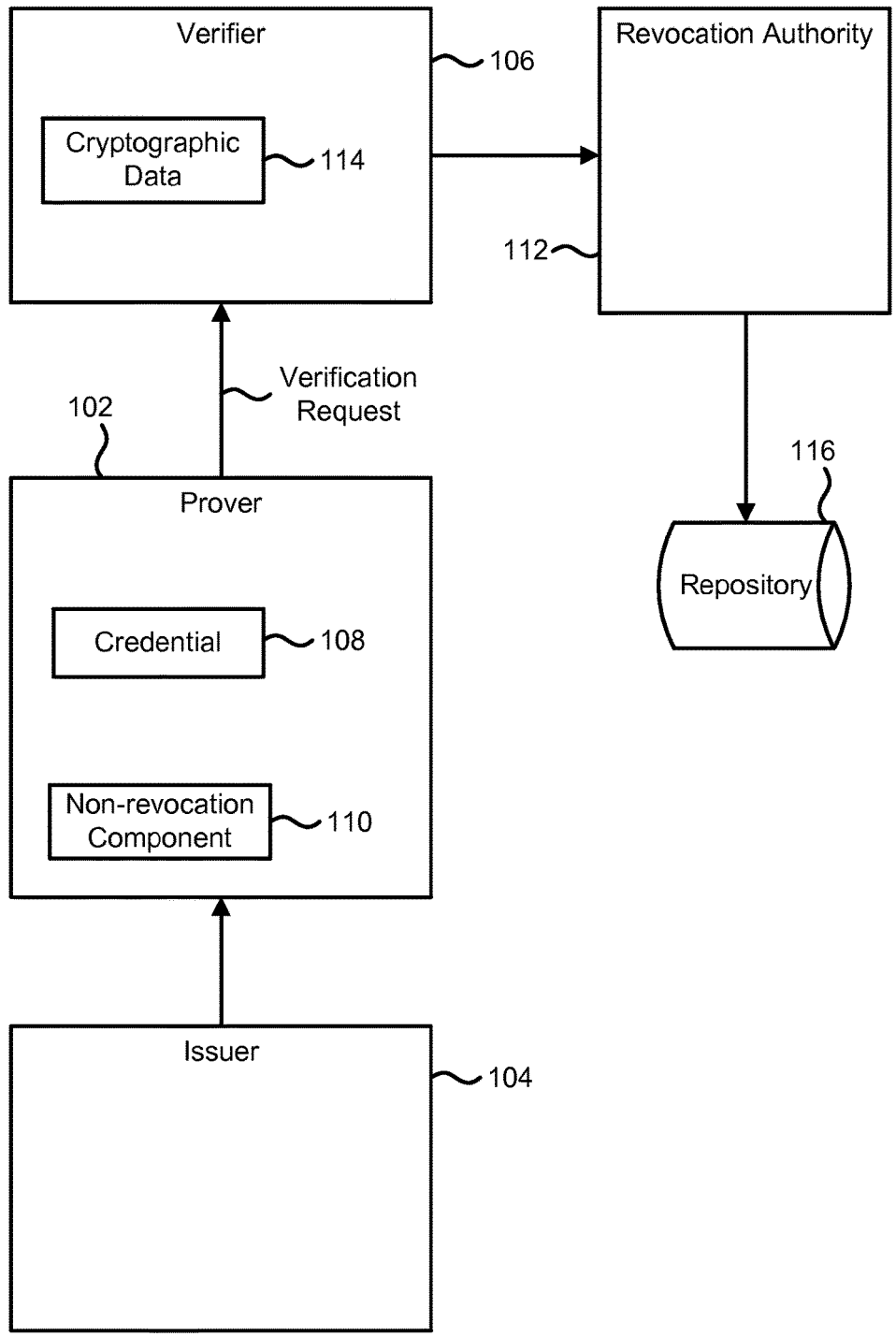
FIG. 1 is a block diagram illustrating an example identity management system according to one or more example implementations.

Various aspects of the technology described herein are generally directed towards minimal disclosure credential verification/revocation as facilitated by components of an identity management system and/or other hardware/software mechanisms. As described herein, one example component herein referred to as an issuer issues credentials that encode attribute data and provides other data for the purpose of authenticating the user when executing online transactions. Another example component includes a credential verification mechanism, or a verifier, configured to apply various cryptographic data to a non-revocation component (e.g., a verifiable signature or presentation proof) that is configured to validate a given minimal disclosure credential. In one aspect, the minimal disclosure credential is based upon a cryptographic scheme configured to allow a user to access service providers and/or initiate online transactions while remaining anonymous and untraceable by issuers and verifiers.

The cryptographic scheme may employ various cryptographic data, including a verifier-designated cryptographic key, such as a private key, which may be generated at random from a prime-order cryptographic group construction, such as a prime-order multiplicative cyclic subgroup of integers, or another construction, such as an elliptical curve group. Such a construction may include a standardized cryptographic group construction in accordance with the Diffie-Hellman assumption. Standardized cryptographic groups generally refer to group parameters generated and set by standardized mechanisms (e.g., Federal Information Processing Standard (FIPS) 186-3 and the American National Standards Institute (ANSI) X9.62), which may be used to issue credentials. To illustrate by way of example, the National Institute of Standards and Technology (NIST) provides example embodiments for a number of standardized cryptographic groups. Alternatively, the cryptographic data may include a verifier-generated challenge value that also is an element of a prime-order cryptographic group construction, including a prime-order additive subgroup of integers. This construction may be built without anything that could be considered a bilinear pairing between subgroups of integers and instead, may be based upon a discrete logarithmic group.

In addition to issuance and verification, the identity management system includes a revocation authority that computes and makes available an accumulator representing at least one revoked user identifier (e.g., a blacklist) or at least one valid user identifier (e.g., a whitelist) according to one or more example implementations. The accumulator generally refers to a value based upon a prime-order subgroup construction that may be computed for a designated verifier who, on behalf of the service provider, uses private cryptographic data, such as the verifier-designated private cryptographic key described herein, to validate the credential's non-revocation status. After selecting an undisclosed attribute for accumulation, the revocation authority may use the verifier-designated cryptographic key to compute the accumulator and a witness for that attribute, which may be herein referred to as a revocation attribute, whose membership or non-membership in the accumulator refers to that credential's revoked or non-revoked status, respectively.

In one example implementation, on behalf of a user, a third party identity provider generates a unique user identifier for the identity management system to use when issuing and verifying that user's credential's non-revocation status. Note, the identity management system may know the unique user identifier, but may not know any other data identifying the user, such as the user's name. Accordingly, a user computing device may initiate transactions with service providers while remaining anonymous or only disclosing a negligible amount of information, by using a credential that encodes the unique user identifier as a signed undisclosed attribute. A component known as a prover running within the user computing device generates a non-revocation component, which comprises at least a presentation proof, for verifying that the unique user identifier is legitimate and therefore, the credential is valid and not revoked. By applying the verifier-designated cryptographic key or the verifier-generated challenge to the presentation proof, the verifier determines whether the credential has been revoked.

In addition to proving non-revocation via the verifier-designated cryptographic key or the verifier-generated challenge, the presentation proof serves a number of security purposes, such as proving integrity and source authenticity of user-disclosed attributes associated with the presented credential, and establishes that the user owns a private key for presenting/signing the attributes and the transaction related data. One example implementation may utilize, in part, the credential's commitment to generate a hash value for comparison with the presentation proof.

Hence, the presentation proof may also be referred to as a designated-verifiable signature, which generally defines a digital signature that is specifically generated for a user and can only be verified with a secret. The verifiable signature allows digital signature generation for a specific target verifier rather than anyone.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and computer security in general.

FIG. 1 is a block diagram illustrating an example identity management system according to one or more example implementations. One example component of the identity management system includes a prover 102 configured to obtain secure minimal disclosure credentials with an issuer 104 on behalf of a user and then, initiate verification requests directed to a verifier 106 for some service provider associated with that user. The issuer 104 generally refers to an authoritative source of cryptographic information, including public/private cryptographic keys and secure credentials, for user computers being managed by the identity management system. The prover 102 running on an example user computer provides the issuer 104 with various data that, once authenticated, is encoded and returned as secure attribute data embedded within a secure minimal disclosure credential 108. For the sake of clarity, the minimal disclosure credential 108 may be herein referred to as the credential 108. The minimal disclosure credential 108 may be stored within a device (e.g., a smartcard, a mobile phone, or an online server).

The verifier 106 generally refers to a trusted hardware/software mechanism running within a computing device that provides various services. The verifier 106 may use a variety of mechanisms to perform the credential verification and revocation. As one example, the verifier 106 processes a non-revocation component 110 from the prover 102 that is configured to validate the credential 108 and/or any associated transaction.

The credential 108 may include encoded attribute data, such as identity data (e.g., a full name, a social security number (SSN), and/or the like), in addition to various other data. The prover 102 may maintain other credentials in which each credential encodes a different portion of the attribute such that the user can selectively disclose private and/or confidential information. As described herein, the credential 108 includes an undisclosed encoded attribute, which is not decipherable or identifiable except to those parties with a secret key or function. The issuer 104, according to one example implementation, configures for the credential 108 one or more public/private keys using various data, such as another cryptographic key, which may be referred to as a secret key or a private key, the encoded attribute data and/or elements of a prime-order cyclic group.

As described herein, if the user requests access to some service provider, the verifier 106 applies the non-revocation component 110 to the credential 108 and/or other data to determine whether to grant or deny the user's request while maintaining that user's anonymity. The user may disclose the credential 108, which may include a considerable large mathematical number or construct, without revealing the identity of the user or the user's organization or device. The credential 108 includes at least one unique identifier corresponding to the user.

The issuer 104 and the prover 102 establish various parameters in accordance with a prime-order group construction without bilinear pairings; and based upon these parameters, the issuer 104, or a separate authority, generates the credential 108 having a compatible format of cryptographic and user data according one example embodiment.

One example parameter established between the issuer 104 and the prover 102 includes a group $\mathcal{G}$ construction selection. If the example parameter specifies a subgroup construction, group $\mathcal{G}$'s description (p, q, g) specifies a subgroup of prime order q of a finite field of order p. Both p and q are prime numbers, q divides p−1, and g is a generator of $\mathcal{G}$. Another example parameter specifies a group construction based upon elliptic curve cryptography over a prime field $\mathbb{F}_p$, group $\mathcal{G}$'s description (p, a, b, g, q, h) specifies an elliptic curve over a finite field $\mathbb{F}_p$, where p is a prime number, a and b are two field elements defining the elliptic curve, g is a base point $(g_x, g_y)$ of prime-order q on the curve (and the generator of $\mathcal{G}_q$), a is the order of the group, and h is the co-factor of the curve. These group constructions may form a basis for generating standardized cryptographic groups and primitives.

To illustrate one example group $\mathcal{G}$ construction, let $\mathcal{G}$ be a cyclic group, whose order is a prime q and whose elements can be represented as $g_i \in \mathcal{G}$ for i=0 ... q−1. Some of these elements may be herein referred to as generators that are configured to generate each group element such that $\mathcal{G} = \langle g \rangle = \{g^i | i \text{ is an integer in } 0, \ldots, q-1\}$ for any i. For a group $\mathcal{G}$ of prime order, hereafter denote the set $\mathcal{G}^* = \mathcal{G} \setminus \{\mathcal{O}\}$ where $\mathcal{O}$ is the identity element of the group. Unless stated otherwise, the computations of elements in $\mathbb{Z}_q$ are assumed to be in mod q.

One example implementation of the cyclic group $\mathcal{G}$ conforms to the Discrete Logarithm (DL) assumption in which for every probabilistic polynomial time (PPT) algorithm A where $x' \mathbb{Z}_q^*$, the following function is negligible with respect to the security parameter I.

$$Adv_A^{DL}(l) = Pr[A(q, \mathcal{G}, g, g^x) = x]$$

Another example implementation of the cyclic group $\mathcal{G}$ conforms to the Strong Diffie-Hellman (SDH) assumption, which states that there generally is no probabilistic polynomial time (PPT) algorithm A that can compute a pair $$\left(c, g^{\frac{1}{x+c}}\right),$$

where $c \in \mathbb{Z}_q$, from a tuple $(g, g^x, \ldots, g^{x^n})$. Furthermore, cyclic group $\mathcal{G}$ conforms to the Strong Diffie-Hellman assumption in which for every probabilistic polynomial time (PPT) algorithm A where $x \rightarrow \mathbb{Z}_q^*$, the following function is negligible:

$$Adv_A^{SDH}(l) = Pr[A(q, \mathcal{G}, g, g^x, \ldots, g^{x^n}) = \left(c, g^{\frac{1}{x+c}}\right) \wedge (c \in \mathbb{Z}_q)]$$

Based upon either one or both of these assumptions, the example system implements at least two accumulator-based revocation schemes. These schemes may include any prime-order cryptographic group-based scheme. It is appreciated that the present disclosure envisions the use of alternative accumulator-based revocation schemes based on other assumptions. Each revocation scheme provides a universal dynamic accumulator and corresponding polynomial-time functionality. One example function (e.g., a "Setup" function) processes a substantially large binary string as input and outputs setup parameters, including a domain of elements to be accumulated, and/or auxiliary information. Another example function processes the setup parameters and a set of elements as input and returns an accumulator. Optionally, the auxiliary information may be used to compute the accumulator more efficiently. Another set of example functions represent a membership proof system configured to prove that an element is, in fact, accumulated in the accumulator. One example function computes a membership witness for this proof using cryptographic data 114, the set of elements, and the undisclosed attribute being used as the credential 108. Yet another set of example functions represent a non-membership proving system that proves that an element is not accumulated in the accumulator.

An accumulator is dynamic if polynomial-time functions exist whose costs do not depend upon the number of accumulated elements with respect to adding/removing user identifiers to or from the accumulator and updating a non-membership or membership witness. These user identifiers represent a set of revoked credentials or a set of valid credentials. One or more example implementations of the cryptographic data 114 include verifier-specific cryptographic data for computing the accumulator, updating the accumulator in response to credential revocations and/or subsequently, determining credential validity using the non-revocation component 110.

By way of example, the following describes an implementation without a central revocation authority, where $\mathcal{G}$ is a cyclic group of prime order and $x \in \mathbb{Z}_q$, represents a challenge from the verifier 106 to the prover 102. Suppose n elements are accumulated into an accumulator representing revoked identifiers of which identifier u is not a member and whose witness is defined as a function $f(x)=c(x)(x-u)+d$ in accordance with the revocation scheme. The value u represents the user's identifier for which the prover 102 generates the non-revocation component 110 proving u's non-membership in the accumulator. The value d represents a remainder value. The prover 102 computes the remainder d and coefficients $a_i$ of function $c(x) = \sum_{i=0}^{n-1} a_i x^i$ and $B = \prod_{i=0}^{n-1} g_i^{a_i} g_n^d$. The prover 102 communicates a commitment $C_1$ to the remainder d and coefficients of function c(x) where $C_1 = B g^{r_1}$ and receives the challenge $x \leftarrow \mathbb{Z}_q$ in return. The prover 102 may compute a cryptographic element $A = g^{f(x)}$ and designate that element for the verifier 104 to use for validating non-revocation of the credential 108. Alternatively, the prover 102 may receive that element from the verifier. Using this element, the prover 102 generates a zero-knowledge proof of u, d, $a_i$ (i=0 ... n−1), $r_u$, $r_1$, $r_2$, $r_2'$ such that $$C_u = g_1^u g_2^{r_u} \wedge C_1 =$$

$$\prod_{i=0}^{n-1} g_i^{a_i} g_n^d g^{r_1} \wedge C_2 = g^{\sum_{i=0}^{n-1} a_i x^i} g_0^{r_2} \wedge AC_2^{-x} = C_2^{-u} g^d g_0^{r_2'} \wedge d \neq 0$$

where $C_u$ represents a commitment to the user identifier and $C_2$ represents a commitment to the function c(x), proving that the user is not accumulated in the set of revoked identities. In the above proof, the values labeled $r_u$, $r_1$, $r_2$, $r_2'$ denote randomly generated numbers.

One example implementation includes one or more verifier-designated cryptographic keys, such as a public key of pka=(q, $\mathcal{G}$, P, H, K, G) and a private key of δ of which both are maintained by the verifier 106 and/or the revocation authority 112. Generally, the private key $\delta \in \mathbb{Z}_q^*$, which is a multiplicative group of integers, and random group generators P, H, G∈$\mathcal{G}$ such that K=$H^\delta$. Alternatively, H and G may be related to other issuer parameters, for example H=g and/or G=$g_1$. The private key δ may be generated at random from $\mathbb{Z}_q^*$.

According to one example embodiment involving a U-prove cryptographic scheme, during issuance, the prover 102 generates cryptographic keys, such as a private key $\alpha^{-1} \in \mathbb{Z}_q^*$ of the credential 108. A corresponding public key for the credential 108, which is evaluated as h=$(g_0 g_1^{x_1} \ldots g_n^{x_n} g_t^{x_t})^\alpha$ where each attribute value $x_i \in \mathbb{Z}_q \setminus \{-\delta\}$ for i ... n are generated, includes a unique user identifier $x_{id}$ encoded as one of the attributes $x_i$ (1≤i≤n). To blacklist an identity, the revocation authority accumulates $x_{id}$. In one exemplary implementation, $x_{id}$ uniquely identifies the user or an organization.

According to one example implementation, the verifier 106, or alternatively, an independent revocation authority, provides a repository 116 for storing various cryptographic scheme related information and implements protocols for verifying an identity of the user to third parties, such as the service provider, without disclosing that identity. As will be understood, this is done without disclosing private or confidential information (e.g., social security numbers, credit card numbers, intellectual property, passwords and/or the like). In one exemplary implementation, the repository 116 includes various mathematical numbers (e.g., numbers exceeding over 100 digits) that follow certain, well-known cryptographic principles.

For example, the repository 116 includes encoded attributes associated with at least one revoked user in the form of a blacklist. These attributes may refer to accumulated credentials of revoked users. Alternatively, the repository 116 includes accumulated credentials for valid users in the form of a whitelist. The repository 116 also includes packages of mathematical numbers that, when applied to corresponding portions of the credential 108, effectuate secure user verification for the service provider.

The verifier 106, operating as a revocation authority, accumulates identifiers associated with the at least one revoked user to create a value representing each member, which may be referred to as an accumulator. Such a value may exceed several hundred digits and constitute a portion of a blacklist according to some embodiments of the present disclosure. Similarly, user identifiers for the at least one valid user may be accumulated to form a whitelist.

As described herein, if the user is not a member of the blacklist, or alternatively, if the user is a member of the whitelist, the non-revocation component 110 includes one or more mathematical values that complement the accumulator. These mathematical values may include one or more membership/non-membership proof components, one or more witness values, one or more commitment values and/or the like. Using the one or more witness values, the prover 102 generates the non-revocation component 110 for proving membership or non-membership while selectively disclosing certain attributes. The user retains any information that is to remain private. In one example embodiment, the user only communicates a credential identifier and no other attribute.

The non-revocation component 110 constitutes a proof-of-possession of the private key of the prover 112 as well as a digital signature of the user on transaction-related data in which the digital signature is verifiable via verifier-specific cryptographic data. Hence, the non-revocation component 110 operates as a verifiable digital signature on the transaction-related data (e.g., messages). To create a digital signature with the credential, the prover 102 generates non-revocation component 110 using a verifier-designated public key. The non-revocation component 110 also includes various cryptographic data that enable the verifier 106 to authenticate the digital signature by verifying that the credential's commitment was generated using the verifier-designated public key and/or verifying that the credential's accumulator-based witness was generated using the verifier-designated private key or the verifier-designated challenge.

Optionally, the issuer 104 issues the credential 108 to the prover 102 in such a manner that the prover 102 cannot use the credential without the assistance of a trusted device (e.g., a smartcard, a mobile phone, or an online server). Generally, such a device may be configured to efficiently protect multiple credentials issued by any number of issuers, and dynamically (e.g., at presentation time) enforce policies on behalf of the issuers, verifiers, or third parties—without compromising the privacy of the prover 102 and without needing to interact with the issuer 104.

Figure 2:
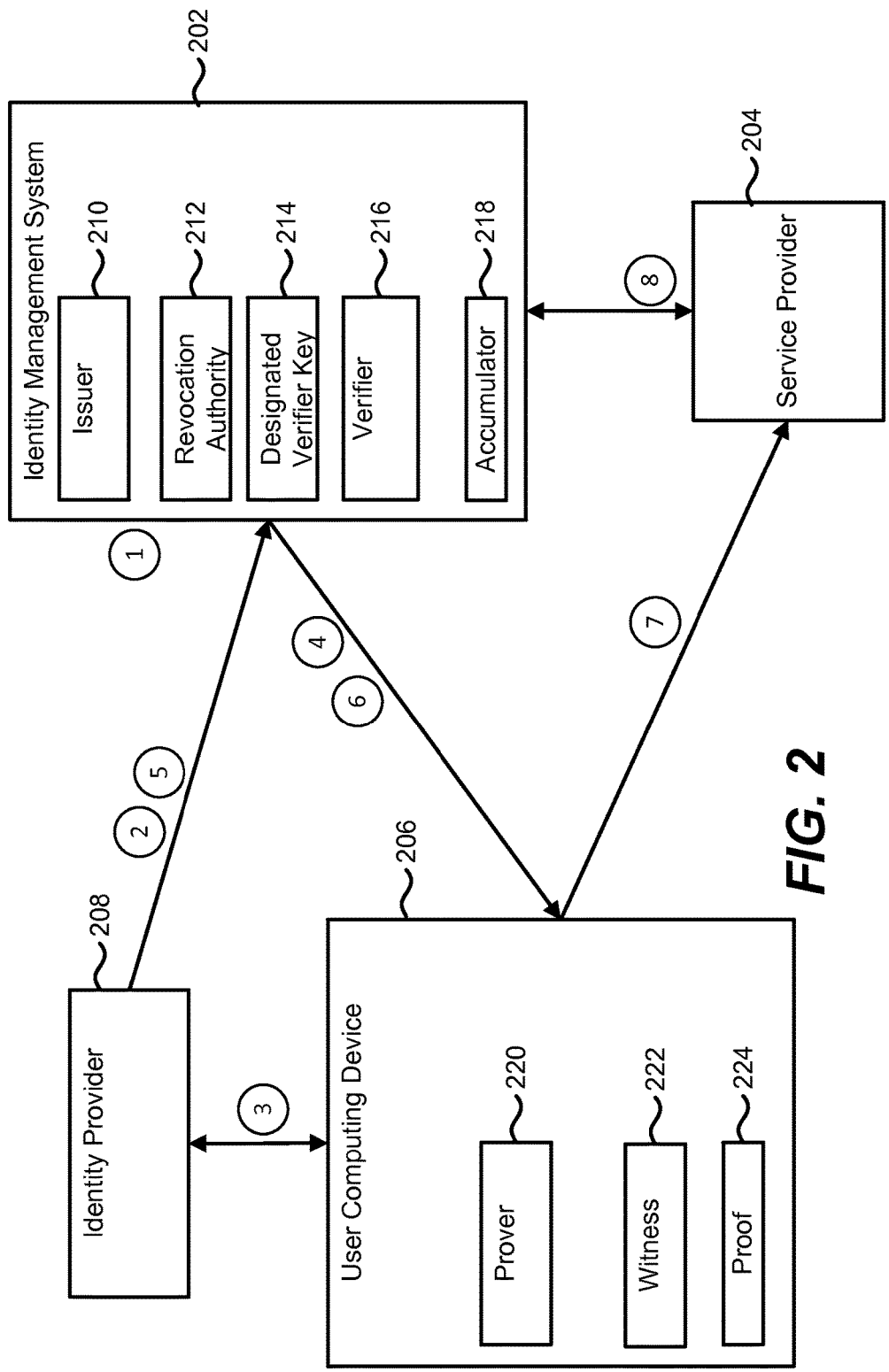
FIG. 2 is a block diagram illustrating an example protocol for credential verification and revocation according to one or more example implementations.

FIG. 2 is a block diagram illustrating an example protocol for credential verification according to one or more example implementations. The example system is an alternate implementation of the exemplary system described with respect to FIG. 1. Parties involved in the example protocol include an identity management system 202, a service provider 204, a user computing device 206 and an identity provider 208. It is appreciated that other parties may be recruited at any operation prescribed by the example protocol.

The identity management system 202 may be implemented as a network or cloud computing resource in which an issuer 210 generates various cryptographic data, including cryptographic keys based upon prime-order cyclic groups and other cryptographic primitives. Example architectures of the identity management system 202 include Microsoft® Windows® Live Id and Microsoft® Azure™ Active Directory® in which a trusted Security Token Service (STS) authenticates users and then, issues credentials to access other relying services. By operating as a designated-verifier revocation authority for accumulator-based cryptographic schemes, the designated-verifier property of the trusted STS provides another level of privacy. One embodiment of the identity management system 202 may be an integrated service over the network or cloud-computing resource, such as a Microsoft® Windows® Azure™ Active Directory® federation service.

The identity management system 202 configures a verification mechanism, herein referred to as a verifier 216, to authenticate the user computing device on behalf of the service provider 204. The identity management system 202 may also implement a revocation authority 212 for managing blacklists and/or whitelists comprising revoked and/or valid identifiers, respectively. One example implementation of the example protocol involves the revocation authority 212 assigning a set of cryptographic keys to each credential verification mechanism.

The user employs security credential technology in order to selectively disclose attribute information and still be permitted access to services associated with the service provider 204. The service provider 204 includes various online (i.e., Internet) properties that employ accumulator-based identity revocation and verification to protect information stored within computer data. The service provider 204 uses the identity management system 202 for credential validation by applying a non-revocation component to the credential associated with the user to determine membership or non-membership in either a group of revoked identities or valid identities as described herein.

To illustrate one example, the identity provider 208 includes a licensing department that generates at least one credential using various user data and issues the at least one credential to the user. As described herein, each credential includes a different combination of attributes, such a Vehicle Identification Number (VIN), car make/model, credential identifier, owner name, driver's license number and/or the like. Depending upon which attribute, if any, the user desires to disclose, the licensing department configures a valid credential with an encoding of only these attributes. The identity provider 208 enables the revocation authority 212 to revoke a credential based on characteristics of the valid user identifier embedded therein as an attribute. Once revoked, the public/private key pair associated with the credential cannot be used again.

As depicted by FIG. 2, one example implementation of the example protocol executes a sequence of at least eight operations where each operation corresponds to specific chronological point in time. Each operation's label is an encircled number representing that operation's sequence position.

At operation one (1), the identity management system 202 initiates the example protocol when a component referred to as the issuer 210 generates setup parameter data, including cryptographic data for securing user data. Generating setup parameters results in any combination of identifiers (e.g., application-specific identifiers), a cryptographically secure hash algorithm, public/private cryptographic keys for issuing credentials and/or the like.

According to one example implementation, the revocation authority 212 generates a private key δ, at random, from a prime-order group $\mathbb{Z}_q^*$ and designates the private key δ for credential verification. It is appreciated that the present disclosure may refer to the private key δ as a verifier-designated private (cryptographic) key 214 and vice versa. The revocation authority 212 provides the verifier 216 with the verifier-designated key 214 to perform credential verification. As described herein, credential verification may involve determining non-membership or membership in a blacklist or a whitelist, respectively, in which the blacklist represents a set of revoked user identities and/or the whitelist represents a set of valid user identities. If a user's identity is revoked, any credential based upon that identity also is revoked and is to be considered invalid.

At operation two (2), the identity provider 208 assigns a unique identifier to the user's devices and informs the identity management system 202 as to the unique identifier's value, which may refer to the user or the user's organization. The issuer 210 embeds the unique identifier as an undisclosed attribute in the credential. As an example, the issuer 210 employs a cryptographic hash function UID $\mathcal{H}$ and the unique identifier to compute a hash value, representing one example attribute that the user can recruit to prove non-revocation of the unique identifier and obtain access to the service provider 204. As another example, the issuer 210 transforms the unique identifier's value into a binary encoding of an unsigned integer in big-endian byte-order, which must be smaller than q to be a valid element of multiplicative subgroup $\mathbb{Z}_q^*$.

At operation three (3), the user, via the user computing device 206, authenticates certain credentials with the identity provider 208. To illustrate one example, the user may login into web server associated with the identity provider 208 by using a valid password. At operation four (4), the user receives a credential encoding the unique identifier as an undisclosed attribute and stores the credential in the user computing device 206. Optionally, the credential may be stored in a separate trusted device coupled to the user computing device 206.

A component of the user computing device 206, referred to herein as a prover 220, is configured to obtain access to the service provider 204 using a valid credential. According to one example embodiment involving U-Prove credentials, the prover 220 randomly generates a private key $\alpha^{-1} \in \mathbb{Z}_q^*$, and computes a public key $h=(g_0 g_1^{x_1}, \ldots g_n^{x_n} g_t^{x_t})^\alpha$ mod p using the public key of the issuer 210 in which one of the attributes $x_i$ encodes the user identifier $x_{id}$. The modular multiplicative inverse of the private key randomizes the public key.

Assuming an example revocation attribute for the user identifier $x_{id}$ corresponds to the credential to be revoked, according to one example implementation, the revocation authority 212 selects that user identifier for revocation and accumulates $x_{id}$ into an accumulator 218. The user identifier $x_{id}$ may represent any object; to illustrate a few examples, $x_{id}$ may uniquely identify a credential, a user or an organization.

The revocation authority 212 produces the accumulator 218 with one or more components of public key pka, using the same q as the issuer 210, and the verifier-designated private key 214. In one example implementation, the revocation authority 212 includes the blacklist representing at least one revoked identifier or, alternatively, a whitelist represents at least one valid identifier. The revocation authority 212 may publish the blacklist and or the whitelist with a signature or, alternatively, kept the blacklist and/or the whitelist secret. If signed, anyone with a public key may validate the signed blacklist/whitelist.

Values comprising a witness 222, which determine membership or non-membership of the user identifier $x_{id}$ in the accumulator 218, may be computed using the verifier-designated private key 214 and sent to the user. From that moment, the user can update the witness when the accumulated list changes based on the history of the accumulator values. As described herein, the proof 224 is generated using the accumulator 218 and the witness 222 in order to verify that the user's identity is not revoked and therefore, the user's credential is valid. The proof 224 includes a non-membership proof or a membership proof that enhances security at the service provider 204, such as an online vehicle auction web server. The membership proof proves that the user identifier $x_{id}$ is accumulated. The non-membership proof, in contrast, proves that the user identifier $x_{id}$ is not accumulated. Based upon the proof 224 and the verifier-designated private key 214, the verifier 216 determines whether the user's identity is not revoked and therefore, the credential is valid.

At operation five (5), the revocation authority 212 of the identity management system 202 periodically updates the blacklist of revoked identifiers or the whitelist comprising valid identifiers. In one example implementation, the identity provider 208 and/or other identity providers communicate valid credentials to the revocation authority 212 and at a later point in time, inform the revocation authority 212 when these identities become revoked.

To illustrate one example implementation, for a blacklist comprising a set of revoked identifiers $\{x_1, \ldots, x_m\} \in \mathbb{Z}_q \setminus \{-\delta\}$ where $m \leq k$, the accumulator 218 is computable in polynomial time with the expression $V = P^{\prod_{i=1}^{m}(\delta + x_i)}$. If a whitelist of valid identifiers $\{x_1, \ldots, x_m\} \in \mathbb{Z}_q \setminus \{-\delta\}$ is employed instead of the blacklist, the accumulator 218 may be computed in polynomial time with the same expression $V = P^{\prod_{i=1}^{m}(\delta + x_i)}$ where $\delta$ is the verifier-designated private key 214.

At operation six (6), the user periodically obtains non-revocation witnesses from the identity management system 202. These non-revocation witnesses include values computed from the unique identifier attribute used for the credential. In one implementation, for the user identifier $x_{id}$ not in the blacklist, the witness 222 is labeled by $(W, d, Q)$ and computed using expression $(W = P^{(\prod_{i=1}^{m}(\delta + x_i) - d)/(\delta + x_{id})}$, $d = \prod_{i=1}^{m}(\delta + x_i) \mod(\delta + x_{id}) \in \mathbb{Z}_q$, $Q = VW^{-x_{id}}P^{-d})$, proving that $x_{id}$ is not accumulated in V (then $Q = W^\delta$). If there are several members added or deleted to the blacklist or the whitelist, the identity management system updates Q after completely updating W, d.

In example implementations associated with member addition, when a new attribute x' for a revoked identifier is accumulated into the accumulator 218, a new witness (W', d', Q') of the user identifier $x_{id}$ can be computed as $(W' = VW^{(x'-x_{id})}$, $d' = d(x'-x_{id})$, $Q' = V'W'^{-x_{id}}P^{-d'})$ where V' is the new accumulated value. For implementations involving member deletion, when an accumulated attribute x' is removed, the new witness (W', d', Q') of $x_{id}$ can be computed as $$\left(W' = (V'^{-1}W)^{\frac{1}{x'-x_{id}}}, d' = \frac{d}{x'-x'}, Q' = V'W'^{-x_{id}}P^{-d'}\right).$$

At operation seven (7), the user presents the credential to the service provider 204 with the witness 222 of the accumulator 218 and the proof 224. As described herein, the witness 222 is used to generate a non-membership or membership proof that is stored in the proof 224. For some value $x_{id}$ in the credential that is not accumulated in the accumulator 218, proving that $x_{id}$ is not accumulated is equivalent to the following expression:

$$PK\{(W,d,x_{id}): V = W^{\delta + x_{id}} P^d \wedge d \neq 0\}$$

Let $X := WH^{t_1}$ and $Y := QK^{t_1}$, then $Y = X^\delta$ and the previous expression is equivalent to:

$$PK\{(t_1,d,x_{id}): VY^{-1} = X^{x_{id}} H^{-t_1 x_{id}} K^{-t_1} P^d \wedge Y = X^\delta \wedge d \neq 0\}$$

The following five steps refer to one example implementation for generating the non-membership proof of validity for $x_{id}$'s commitment $C := G^{x_{id}} H^u$ where u is set by a commitment scheme:

1. Generate $t_0, t_1, t_2, t_3, k_0, \ldots, k_8 \in_R \mathbb{Z}_q$
2. Compute
   $B := G^{k_0} H^{t_0}$
   $X := WH^{t_1}$; $Y := QK^{t_1}$; $R := G^t{}_1 H^{t_2}$; $S := G^{d^{-1}} H^{t_3}$
   $T_1 := G^k{}_1 H^{k_2}$; $T_2 := G^k{}_7 H^{k_4} R^{-k_0}$; $T_3 := G^{k_6} H^{k_3}$; $T_4 := H^{k_8} S^{-k_5}$
   $\Gamma := X^{-k_0} H^{k_7} K^{k_1} P^{-k_5}$
3. Compute hash challenge
   $c := \mathcal{H}(pka, C, B, X, Y, R, S, T_1, T_2, T_3, T_4, \Gamma)$
4. Compute
   $r_0 := -cu + t_0 \mod q$; $s_0 := -cx_{id} + k_0 \mod q$
   for each $i \in \{1, 2, 3\}$, $s_i := -ct_i + k_i \mod q$
   $s_4 := -ct_2 x_{id} + k_4 \mod q$; $s_5 := -cd + k_5 \mod q$
   $s_6 := -cd^{-1} + k_6 \mod q$; $s_7 := -ct_1 x_{id} + k_7 \mod q$
   $s_8 := -ct_3 d + k_8 \mod q$
   Delete $t_0, t_1, t_2, t_3, k_0, \ldots, k_8$
5. Return the generated proof of $c, r_0, s_0, \ldots, s_8, X, Y, R, S$ A first step of the above steps refers to generating random numbers (e.g., integers) in $\mathbb{Z}_q$—a prime-order cyclic group of order q under addition. The set of $\mathbb{Z}_q$ is isomorphic to the elements of group $\mathcal{G}$. With respect to a second step, the prover 220 uses the commitment of $x_{id}$ to compute a number of different mathematical elements in group $\mathcal{G}$ for the purpose of computing a hash challenge c at step three. Using the user identifier $x_{id}$, the prover computes a set of real positive numbers $r_0, s_0, \ldots, s_8$ based upon the hash challenge c, the commitment values and the user identifier $x_{id}$. Along with elements X, Y, R, S, the set of $r_0, s_0, \ldots, s_8$ and the hash challenge c form at least a portion of a digital signature allowing the user to prove authenticity of the commitment, which means the committed identifier $x_{id}$ was used to compute the witness 222.

In the above proof, $T_3, T_4, s_5, s_6$ show the existence of $d^{-1}$, therefore $d \neq 0$. Commitment of $x_{id}$ could vary, so a presentation protocol between the service provider 204 and the user computing device 206 varies.

The following five steps refer to one alternate implementation for generating the non-membership proof for $x_{id}$'s commitment $C := G^{x_{id}} H^u$:

1. Generate $t_1, t_2, t_3, k_1, \ldots, k_7 \in_R \mathbb{Z}_q$
2. Compute
   $X := WH^{t_1}$; $Y := QK^{t_1}$
   $C_d := P^d G^{t_2}$; $C_x := H^x G^{t_3}$
   $w := d^{-1} \mod q$; $z := t_1 t_3 - t_2 \mod q$; $z' := -t_2 w \mod q$
   $T_1 := X^{k_1} (C_x K)^{-k_2} G^{k_3}$
   $T_2 := G^{k_1} H^{k_4}$
   $T_3 := H^{k_1} G^{k_5}$
   $T_4 := (C_d)^{k_6} G^{k_7}$
3. Compute hash challenge
   $c := \mathcal{H}(pka, C, X, Y, C_x, C_d, T_1, T_2, T_3, T_4)$
4. Compute
   $s_1 := -cx + k_1 \mod q$; $s_2 := -ct_1 + k_2 \mod q$
   $s_3 := -cz + k_3 \mod q$; $s_4 := -cu + k_4 \mod q$
   $s_5 := -ct_3 + k_5 \mod q$; $s_6 := -cw + k_6 \mod q$
   $s_7 := -cz' + k_7 \mod q$
   Delete $z, z', t_1, t_2, t_3, k_1, \ldots, k_7$
5. Return the generated proof of $c, s_1, \ldots, s_7, X, Y, C_x, C_d$ The following five steps refer to yet another alternate implementation for generating the non-membership proof for $x_{id}$'s commitment $C := H^{x_{id}} G^u$:

1. Generate $t_1, t_2, k_1, \ldots, k_6 \in_R \mathbb{Z}_q$
2. Compute
   $X := WH^{t_1}$; $Y := QK^{t_1}$
   $C_d := P^d G^{t_2}$, w:=$d^{-1}$ mod q; z:=$t_1 u - t_2$ mod q; z':=$-t_2$ w mod q
$T_1$:=$X^{k_1}(CK)^{-k_2}G^{k_3}$
$T_2$:=$H^{k_1}G^{k_4}$
$T_3$:=$(C_d)^{k_5}G^{k_6}$
3. Compute hash challenge
c:= $\mathcal{H}$(pka, C, X, Y, $C_d$, $T_1$, $T_2$, $T_3$)
4. Compute
$s_1$:=$-cx+k_1$ mod q; $s_2$:=$-ct_1+k_2$ mod q
$s_3$:=$-cz+k_3$ mod q; $s_4$:=$-cu+k_4$ mod q
$s_5$:=$-cw+k_5$ mod q; $s_6$:=$-cz'+k_6$ mod q
Delete z, z', $t_1$, $t_2$, $k_1$, . . . , $k_6$
5. Return the generated proof of c, $s_1$, . . . , $s_6$, X, Y, $C_d$ At operation eight (8), the service provider 204 communicates the credential and the proof 224 to the identity management system 202 for verification. According to one example implementation, using the revocation authority 212, the verifier 216 determines that the credential is not a member of a blacklist comprising revoked identifiers. If the credential is somehow misused, the credential may be revoked and the user identifier may be accumulated into the accumulator 218 representing at least one revoked identifier. In either implementation, the revocation authority 212 computes the accumulator 218 using at least one attribute from each credential whose user's identity is revoked.

In order to produce the witness 222, the revocation authority 212 uses the accumulator 218, a prime-order cyclic group generator forming the basis of the credential, and a public/private key pair issued to the verifier 216. The accumulator 210 and the witness 222 may be based on a Strong Diffie-Hellman assumption. In another example implementation, the prover 220 computes values for the witness 222.

The following two steps illustrate one exemplary implementation in which the verifier 216 within the identity management system 202 validates a blacklist non-membership proof labeled c, $r_0$, $s_0$, . . . , $s_8$, X, Y, R, S for x's commitment C:=$G^{x_{id}}H^u$:
1. Compute
B:=$G^{s_0}H^{r_0}C^c$
$T_1$:=$G^{s_1}H^{s_2}R^c$; $T_2$:=$G^{s_7}H^{s_4}R^{-s_0}$;
$T_3$:=$G^{s_6}H^{s_3}S^c$; $T_4$:=$G^{-c}H^{s_8}S^{-s_5}$;
$\Gamma$:=$X^{-s_0}H^{s_7}K^{s_1}P^{-s_5}(V^{-1}Y)^c$
2. Verify
c=$_?$ $\mathcal{H}$(pka, C, B, X, Y, R, S, $T_1$, $T_2$, $T_3$, $T_4$, $\Gamma$)
Y=$_?$$X^\delta$ The following two steps illustrate one alternate exemplary implementation in which the verifier 216 within the identity management system 202 validates a blacklist non-membership proof labeled c, $s_1$, . . . , $s_7$, X, Y, $C_x$, $C_d$ for $x_{id}$'s commitment C:=$G^{x_{id}}H^u$:
1. Compute
$T_1$:=$(VY^{-1}(C_d)^{-1})^c X^{s_1}(C_x K)^{-s_2}G^{s_3}$
$T_2$:=$G^c G^{s_1}H^{s_4}$
$T_3$:=$(C_x)^c H^{s_1}G^{s_5}$
$T_4$:=$P^c(C_d)^{s_6}G^{s_7}$
2. Verify
c=$_?$ $\mathcal{H}$(pka, C, X, Y, $C_x$, $C_d$, $T_1$, $T_2$, $T_3$, $T_4$)
Y=$_?$$X^\delta$ The following two steps illustrate a second alternate exemplary implementation in which the verifier 216 within the identity management system 202 validates a blacklist non-membership proof labeled c, $s_1$, . . . , $s_6$, X, Y, $C_d$ for $x_{id}$'s commitment C:=$H^{x_{id}}G^u$:
1. Compute
$T_1$:=$(VY^{-1}(C_d)^{-1})^c X^{s_1}(CK)^{-s_2}G^{s_3}$
$T_2$:=$(C)^c H^{s_1}G^{s_4}$
$T_3$:=$P^c(C_d)^{s_5}G^{s_6}$ 2. Verify
c=$_?$ $\mathcal{H}$(pka, C, X, Y, $C_d$, $T_1$, $T_2$, $T_3$)
Y=$_?$$X^\delta$ A first step labeled "Compute" involves extracting values from the proof 224, including a hash challenge c, and computing mathematical elements of a prime-order cyclic group based upon the extracted values. A first part of a second step labeled "Verify" computes a hash value based upon the mathematical elements computed during the first step, and compares that hash value with the hash challenge c to determine authenticity of the user computing device 206 without learning the identity of the user. A second part of the security step determines whether the verifier-designated key δ was used to compute the witness 222 for the credential. If so, the verifier 216 may assure the service provider 204 as to the validity of the credential without revealing the identity of the user.

With respect to embodiments where the proof 224 is a membership proof for the whitelist, a membership witness (W, Q) is computed using an expression (W=$P^{\prod_{i=1}^m (\delta+x_i)/(\delta+x_{id})}$, Q=$VW^{-x_{id}}$) for a $x_{id}$ in the set of valid credentials for the accumulator 218. Hence, (W, Q) is the witness indicating that $x_{id}$ is accumulated in V in which Q=$W^\delta$.

When members are added or deleted to the whitelist, the identity management system 202 only updates Q after completely updating W. In one exemplary implementation of member addition, when a new credential x' is accumulated, a new witness (W', Q') of $x_{id}$ can be computed as (w'=$VW^{(x'-x_{id})}$, Q'=$V'W'^{-x_{id}}$), where V' is the new accumulating value. In one exemplary implementation of member deletion, when an accumulated credential x' is removed, the new witness (W', Q') of $x_{id}$ can be computed as the tuple $$\left(W' = (V'^{-1}W)^{\frac{1}{x'-x_{id}}}, Q' = V'W'^{-x_{id}}\right).$$

With respect to generating a membership proof for an accumulated $x_{id}$, after computing or updating $x_{id}$'s witness (W, Q), proving that $x_{id}$ is accumulated is equivalent to the following expression: PK{(W, $x_{id}$):V=$W^{\delta+x_{id}}$}. By assigning X:=$WH^{t_1}$ and Y:=$QK^{t_1}$, then Y=$X^\delta$ and the above expression can be reduced to: PK{($t_1$, $x_{id}$):$VY^{-1}$=$X^{x_{id}}H^{-t_1 x_{id}}K^{-t_1}$}.

Because compatible commitment schemes of $x_{id}$ vary, the presentation protocol also varies. The following four steps illustrate one example whitelist membership proof generation for $x_{id}$'s commitment C:=$G^{x_{id}}H^u$:
1. Generate $t_0$, $t_1$, $t_2$, $k_0$, . . . , $k_4 \in_\mathcal{R} \mathbb{Z}_q$ and compute
B:=$G^{k_0}H^{t_0}$
X:=$WH^{t_1}$; Y:=$QK^{t_1}$; R:=$G^{t_1}H^{t_2}$
$T_1$:=$G^{k_1}H^{k_2}$; $T_2$:=$G^{k_3}H^{k_4}R^{-k_0}$; $\Gamma$:=$X^{-k_0}H^{k_3}K^{k_1}$
2. Compute hash challenge
c:= $\mathcal{H}$(pka, C, B, X, Y, R, $T_1$, $T_2$, $\Gamma$)
3. Compute
$r_0$:=$-cu+t_0$ mod q; $s_0$:=$-cx_{id}+k_0$ mod q
for each i∈{1,2}, $s_i$:=$-ct_i+k_i$ mod q
$s_3$:=$-ct_1 x_{id}+k_3$ mod q; $s_4$:=$-ct_2 x_{id}+k_4$ mod q
Delete $t_0$, $t_1$, $t_2$, $k_0$, . . . , $k_4$
4. Generate Membership Proof
c, $r_0$, $s_0$, . . . , $s_4$, X, Y, R The following four steps illustrate an alternate whitelist membership proof generation for $x_{id}$'s commitment C:=$G^{x_{id}}H^u$:

1. Generate $t_1$, $t_2$, $k_1$, . . . , $k_5 \in_\mathcal{R} \mathbb{Z}_q$ and compute
X:=$WH^{t_1}$; Y:=$QK^{t_1}$
$C_x$:=$H^x G^{t_2}$ $z := t_1 t_2 \bmod q$ $T_1 := X^{k_1}(C_x K)^{-k_2} G^{k_3}$ $T_2 := G^{k_1} H^{k_4}$ $T_3 := H^{k_1} G^{k_5}$ 2. Compute hash challenge $c := \mathcal{H}(\text{pka}, C, X, Y, C_x, T_1, T_2, T_3)$ 3. Compute $s_1 := -cx + k_1 \bmod q$; $s_2 := -ct_1 + k_2 \bmod q$ $s_3 := -cz + k_3 \bmod q$; $s_4 := -cu + k_4 \bmod q$ $s_5 := -ct_2 + k_5 \bmod q$ Delete $z, t_1, t_2, k_1, \ldots, k_5$ 4. Generate Membership proof $c, s_1, \ldots, s_5, X, Y, C_x$ The following four steps illustrate an alternate whitelist membership proof generation for $x_{id}$'s commitment $C := H^{x_{id}} G^u$:

1. Generate $t_1, k_1, k_4 \in_R \mathbb{Z}_q$ and compute $X := W H^{t_1}$; $Y := Q K^{t_1}$ $z := t_1 u \bmod q$ $T_1 := X^{k_1}(CK)^{-k_2} G^{k_3}$ $T_2 := H^{k_1} G^{k_4}$ 2. Compute hash challenge $c := \mathcal{H}(\text{pka}, C, Y, T_1, T_2)$ 3. Compute $s_1 := -cx + k_1 \bmod q$; $s_2 := -ct_1 + k_2 \bmod q$ $s_3 := -cz + k_3 \bmod q$; $s_4 := -cu + k_4 \bmod q$ Delete $z, t_1, t_2, k_1, \ldots, k_4$ 4. Generate Membership Proof:

$c, s_1, \ldots, s_4, X, Y$

The following two steps illustrate one exemplary implementation in which the verifier 216 within the identity management system 202 validates the credential $x_{id}$ by verifying values provided in the whitelist membership proof labeled $c, r_0, s_0, \ldots, s_4, X, Y, R$ for commitment $C := G^{x_{id}} H^u$:

1. Compute $B := G^{s_0} H^{r_0} C^c$ $T_1 := G^{s_1} H^{s_2} R^c$; $T_2 := G^{s_3} H^{s_4} R^{-s_0}$;

$\Gamma := X^{-s_0} H^{s_3} K^{s_1} (V^{-1} Y)^c$

2. Verify $c =_? \mathcal{H}(\text{pka}, C, B, X, Y, R, T_1, T_2, \Gamma)$ $Y =_? X^\delta$ A first step labeled "Compute" involves extracting values from the proof 224, including a hash challenge c, and computing mathematical elements of a prime-order cyclic group based upon the extracted values. A first part of a second step labeled "Verify" computes a hash value based upon the mathematical elements computed during the first step, and compares that hash value with the hash challenge c to determine authenticity of the user computing device 206 without learning the identity of the user. The hash value comparison determines whether $x_{id}$'s commitment was actually computed using the user identifier $x_{id}$ and not junk data. A second part of the security step determines whether the verifier-designated key δ was used to compute the witness 222 for the user identifier $x_{id}$.

The following two steps illustrate one alternate exemplary implementation in which the verifier 216 within the identity management system 202 validates the credential by verifying values provided in the whitelist membership proof labeled $c, s_1, \ldots, s_5, X, Y, C_x$ for commitment $C := G^{x_{id}} H^u$:

1. Compute $T_1 := (VY^{-1})^c X^{s_1}(C_x K)^{-s_2} G^{s_3}$ $T_2 := C^c G^{s_1} H^{s_4}$ $T_3 := (C_x)^c H^{s_1} G^{s_5}$ 2. Verify $c =_? \mathcal{H}(\text{pka}, C, X, Y, C_x, T_1, T_2, T_3)$ $Y =_? X^\delta$ The following two steps illustrate a second alternate exemplary implementation in which the verifier 216 within the identity management system 202 validates the credential by verifying values provided in the whitelist membership proof labeled $c, s_1, \ldots, s_4, X, Y$ for commitment $C := H^{x_{id}} G^u$:

1. Compute $T_1 := (VY^{-1})^c X^{s_1}(CK)^{-s_2} G^{s_3}$ $T_2 := C^c H^{s_1} G^{s_4}$ 2. Verify:

$c =_? \mathcal{H}(\text{pka}, C, X, Y, T_1, T_2)$ $Y =_? X^\delta$

Figure 3:
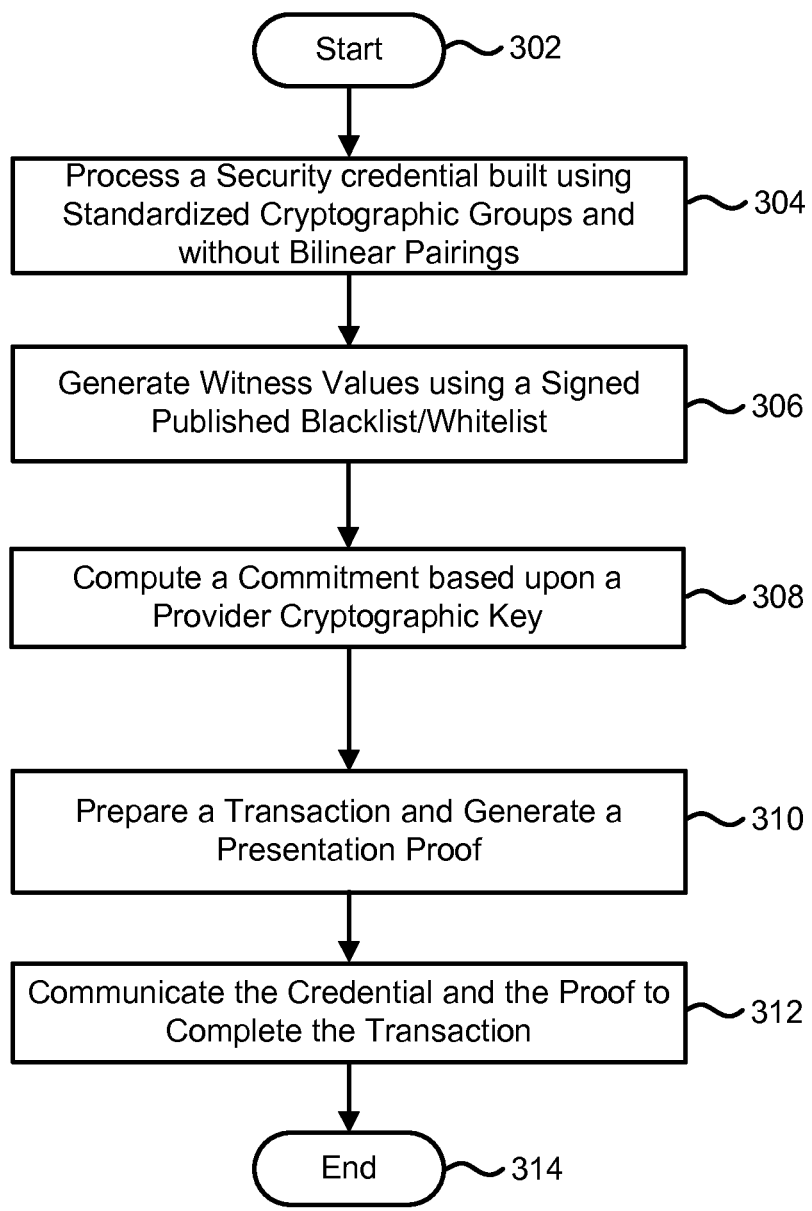
FIG. 3 is a flow diagram illustrating example steps for initiating transactions while remaining anonymous using a minimal disclosure credential according to one or more example implementations.

FIG. 3 is a flow diagram illustrating example steps for initiating transactions while remaining anonymous using a minimal disclosure credential according to one or more example implementations. In one implementation, the example steps are performed by various hardware and/or software, such as the prover 102 of FIG. 1 as described herein.

Steps depicted in FIG. 3 commence at step 302 and proceed to step 304 at which a credential is processed that is built using standardized cryptographic groups. To illustrate by way of example, the National Institute of Standards and Technology (NIST) provides example embodiments for a number of cryptographic groups. One or more credential parameters, such as a public cryptographic key, may be generated with/without any bilinear pairings and/or based on discrete logarithms. The public cryptographic key, for instance, is computed using group generators of a prime-order finite-field subgroup or elliptic curve and a private key generated by the additive subgroup of integers. Both subgroups may be of the same order and/or isomorphic to each other. Some example embodiments do not employ bilinear pairings in order to enable credential verification and revocation. Lacking a central authority, standardized cryptographic subgroups may be instantiated in a more ad-hoc manner, which allows a cryptographic key or challenge value to remain a secret from other computing devices, except for the designated verifier.

The following describes one or more example implementations in which $\mathcal{G}$ represents a standardized cryptographic cyclic group, whose order is a prime q, generated by elements P, H, G ∈ $\mathcal{G}$. A verifier-designed private key is generated for an accumulator and labeled $\delta \in \mathbb{Z}_q^*$. A value for $K = H^\delta$ also is computed. A corresponding domain for elements to be accumulated is $\mathbb{Z}_q \backslash \{-\delta\}$. The accumulator's public key is pka = (q, $\mathcal{G}$, P, H, K, G). The group $\mathcal{G}$ order q may be any NIST standardized groups or any groups used by appropriate cryptographic schemes.

Referring to one example embodiment associated with a U-prove cryptographic scheme, the prover receives at least the following information from an identity management system during a credential issuance protocol:

Issuer parameter fields: $UID_P$, $desc(G_q)$, $UIDD_\mathcal{H}$, $(g_0, g_1, \ldots, g_n, g_t)$, $(e_1, \ldots, e_n)$, S Ordered indices of disclosed attributes: $D \subset \{1, \ldots, n\}$ Ordered indices of undisclosed attributes: $U = \{1, \ldots, n\} - D$ Ordered indices of committed attributes: $C \subset U$ Messages: $m \in \{0,1\}^*$ U-Prove credential: $\mathcal{T} = UID_P$, h, TI, PI, $\sigma_z'$, $\sigma_c'$, $\sigma_r'$, d Private key: $\alpha^{-1} \in \mathbb{Z}_q$ Attribute values: $(A_1, \ldots, A_n) \in \{0,1\}^*$ Accumulator public key pka = (q, $\mathcal{G}$, P, H, K, G)

Witness: (W, d, Q)

It is appreciated that the U-prove cryptographic scheme is one example embodiment and other cryptographic schemes may employ private cryptographic data to validate a proof of credential non-revocation. Step 306 examines the credential's attribute data and identifies a revocation attribute comprising a unique user identifier $x_{id}$ that is a member of the set of attribute values $\{A_1, \ldots, A_n\}$ either in the form of cleartext data (e.g., an integer) or encoded data (e.g., a hash value). Using the unique user identifier $x_{id}$, step 306 generates witness values for proving non-revocation of the credential. The witness values may be computed using a published blacklist/whitelist comprising a signed accumulator. Alternatively, the prover may receive non-revocation witness values (W, d, Q) for the credential from the revocation authority of the identity management system.

Step 308 computes a commitment for the user identifier $x_{id}$ based upon the accumulator's public key elements G, H $\in \mathbb{Z}_q$. A commitment is computed by applying these public key elements to a secret value, such as the unique identifier described herein, such that the commitment both binds to and hides the secret value. The accumulator's public key elements can be set G:=g and H:=$g_1$ where g, $g_1$ are extracted from the issuer parameters. Alternatively, H and G may be set to H=g and/or G=$g_1$, or chosen at random.

Step 310 represents transaction preparation and presentation proof generation. It is appreciated that the presentation proof may be used to authenticate the integrity of transaction related messages to a service provider in addition to proving validity of the credential. One example embodiment for generating commitments to attributes in a presentation proof is as follows:

For each i∈C
  Generate $\tilde{o}_i, \tilde{w}_i$ from $\mathbb{Z}_q$
  $\tilde{c}_i := g^{x_i} g_1^{\tilde{o}_i}$
  $\tilde{a}_i := \mathcal{H}(g^{\tilde{w}_i} g_1^{\tilde{w}_i})$ For each undisclosed yet committed attribute index i, random values $\tilde{o}_i, \tilde{w}_i$ are generated from the subgroup $\mathbb{Z}_q$ and then, used to compute a commitment $\tilde{c}_i$ and a hash value $\tilde{a}_i$.

The following refers to one example implementation for generating a challenge value for verifying the user identifier's commitment:

$$a: H\left(h^{w_0}\left(\prod_{i \in U} g_i^{w_i}\right)\right)$$

$c := \mathcal{H}(IP, \mathcal{T}, a, D, \{x_i\}_{i \in D}, C, \{\tilde{c}_i\}_{i \in C}, \{\tilde{a}_i\}_{i \in C}, m)$
$r_0 := c\alpha^{-1} + w_0 \mod q$
For each i∈U, $r_i := -cx_i + w_i \mod q$ Presenting the credential with at least a commitment and an opening allows the user to access online services anonymously by keeping the user identifier $x_{id}$ secret while achieving verification. Verifying the user identifier $x_{id}$ involves the verification of a cryptographic hash challenge computed independently by both the prover and the verifier.

Example implementations may proceed to following set of operations:

For each i∈C, $\tilde{r}_i := -c\tilde{o}_i + \tilde{w}_i \mod q$
Delete $\{\tilde{w}_i\}_{i \in C}$
Generate random $t_0, t_1, t_2, t_3, k_0, \ldots, k_8 \in_R \mathbb{Z}_q$
B:=$g^{k_0} g_1^{t_0}$
X:=$WH^{t_1}$; Y:=$QK^{t_1}$; R:=$G^{t_1} H^{t_2}$; S:=$G^{d^{-1}} H^{t_3}$
$T_1$:=$G^{k_1} H^{k_2}$; $T_2$:=$G^{k_7} H^{k_4} R^{-k_0}$; $T_3$:=$G^{k_6} H^{k_3}$
$T_4$:=$H^{k_8} S^{-k_5}$; Γ:=$X^{-k_0} H^{k_7} K^{k_1} P^{-k_5}$ Compute hash c':=$\mathcal{H}(g, g_1, pka, \tilde{c}_{id}, B, X, Y, R, S, T_1, T_2, T_3, T_4, Γ)$
Compute r':=$-c'\tilde{o}_{id} + t_0 \mod q$; $s_0$:=$c'x_{id} + k_0 \mod q$
for each i∈{1,2,3}, $s_i$:=$c't_i + k_i \mod q$
  $s_4$:=$c't_2 x_{id} + k_4 \mod q$; $s_5$:=$c'd + k_5 \mod q$
  $s_6$:=$-c'd^{-1} + k_6 \mod q$; $s_7$:=$-c't_i x_{id} + k_7 \mod q$
  $s_8$:=$-c't_3 d + k_8 \mod q$
Delete $t_0, t_1, t_2, t_3, k_0, \ldots, k_8$ According to the above description, the prover computes a response value r' for an committed and undisclosed attribute in C that corresponds to the user identifier $x_{id}$. Computing one example response value r' may involve performing a transformation on the hash challenge c' based upon a commitment $\tilde{c}_{id}$ corresponding to the user identifier $x_{id}$. The prover uses the hash value c' and an opening $\tilde{o}_{id}$ corresponding to the user identifier $x_{id}$ in computing the response value r'.

According to one example implementation, the prover uses a set of randomly generated numbers in $\mathbb{Z}_q$, the hash value c', and the user identifier $x_{id}$ to compute various mathematical numbers based upon a prime-order cyclic group construction, including signature elements $s_0, \ldots, s_8$. The prover assemblies at least some of these numbers as components of the presentation proof, which is communicated to the service provider in step 312. Example embodiments of the presentation proof and commitment to the user identifier $x_{id}$, of which the provider communicates to the service provider for verification, are described below:

Presentation proof: $\{A_i\}_{i \in D}, r_0, \{r_i\}_{i \in U}, \{(\tilde{c}_i, \tilde{a}_i, \tilde{r}_i)\}_{i \in C}$
c', r', $s_0, \ldots, s_8$, X, Y, R, S
Commitment values: $\{\tilde{o}_i\}_{i \in C}$ Other embodiments may be constructed using the alternative blacklist non-membership proofs described herein.

The whitelist, as an alternative mechanism, may need a different set of operations to generate a presentation proof demonstrating membership—and therefore, validity—of the user identifier $x_{id}$. The following represents one example embodiment of such a set of operations with respect to a minimal disclosure credential of which the user identifier $x_{id}$ is accumulated into the whitelist with a witness (W, D):

For each i∈C, $\tilde{r}_i := -c\tilde{o}_i + \tilde{w}_i \mod q$
Delete $\{\tilde{w}_i\}_{i \in C}$
Generate random $t_0, t_1, t_2, k_0, \ldots, k_4 \in_R \mathbb{Z}_q$
B:=$g^{k_0} g_1^{t_0}$
X:=$WH^{t_1}$; Y:=$QK^{t_1}$; R:=$G^{t_1} H^{t_2}$
$T_1$:=$G^{k_1} H^{k_2}$; $T_2$:=$G^{k_3} H^{k_4} R^{-k_0}$
Γ:=$X^{-k_0} H^{k_3} K^{k_1}$ Compute hash c':=$\mathcal{H}(g, g_1, pka, \tilde{c}_{id}, B, X, Y, R, T_1, T_2, Γ)$
Compute r':=$-c'\tilde{o}_{id} + t_0 \mod q$; $s_0$:=$c'x_{id} + k_0 \mod q$
for each i∈{1,2}, $s_i$:=$-c't_i + k_i \mod q$
  $s_3$:=$-c't_1 x_{id} + k_3 \mod q$; $s_4$:=$c't_2 x_{id} + k_4 \mod q$
Delete $t_0, t_1, t_2, k_0, \ldots, k_4$ Step 312 is directed towards communicating the credential, the presentation proof and commitment values to the service provider in order to initiate the transaction. The presentation proof resulting from the above operations and returned to the service provider may be defined as follows:

Presentation proof: $\{A_i\}_{i \in D}$, a, $r_0$, $\{r_i\}_{i \in U}$, $\{(\tilde{c}_i, \tilde{a}_i, \tilde{r}_i)\}_{i \in C}$
c', r', $s_0, \ldots, s_4$, X, Y, R
Commitment values: $\{\tilde{o}_i\}_{i \in C}$ Other embodiments may be constructed using the alternative whitelist membership proofs described herein.

Once the user identifier $x_{id}$ is verified either to be a whitelist member or a blacklist non-member by validating the credential and the presentation proof, the service provider completes the transaction and returns any related data to the prover. Step 314 terminates the example steps depicted for FIG. 3.

Figure 4:
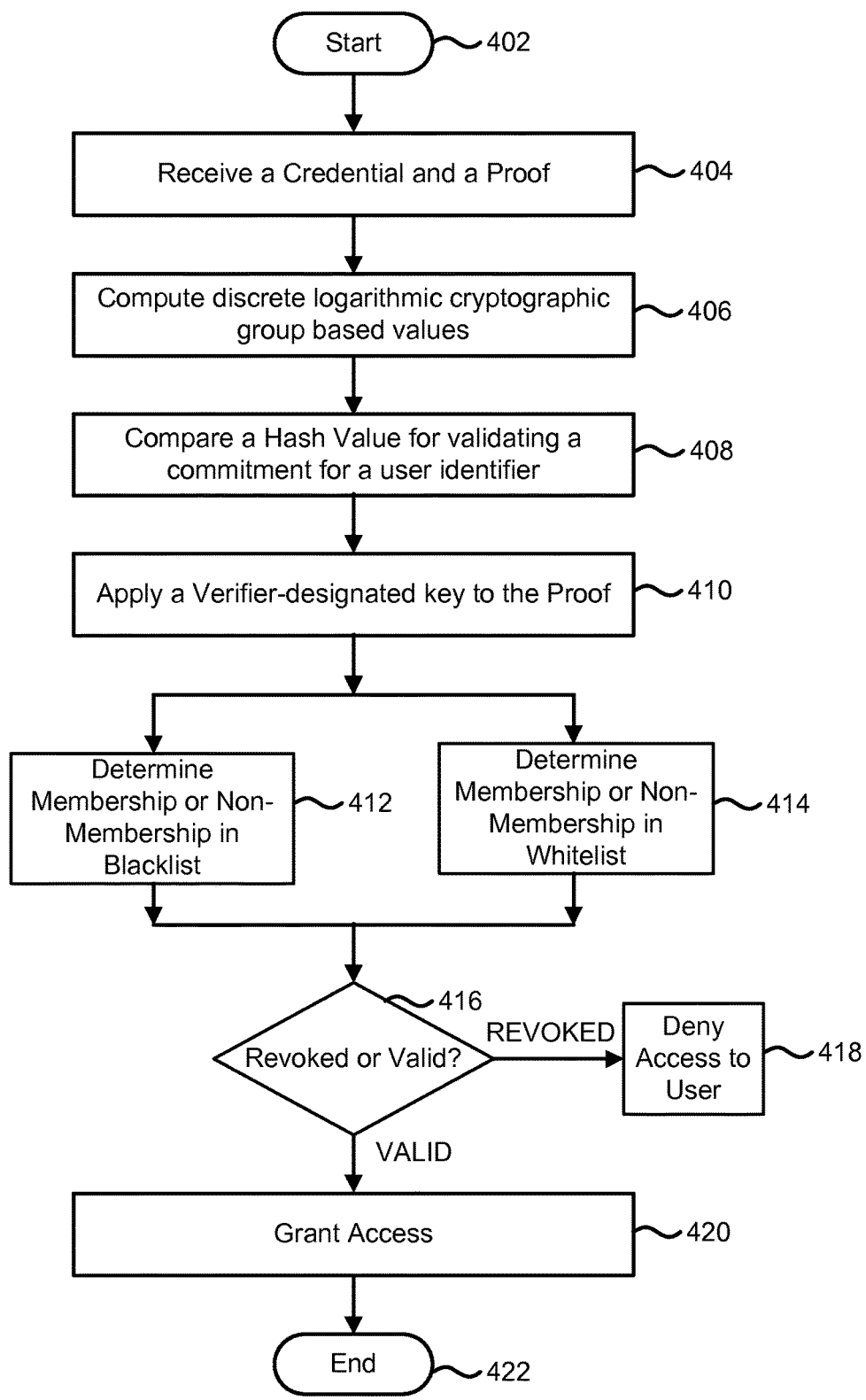
FIG. 4 is a flow diagram illustrating example steps for controlling access to a service provider according to one or more example implementations.

FIG. 4 is a flow diagram illustrating example steps for controlling access to a service provider according to one or more example implementations. In one implementation, the example steps are performed by various software and/or hardware, such as the verifier 106 of FIG. 1 as described herein.

Access control may involve verifying a credential's validity by applying verifier-specific cryptographic data to a non-revocation component, such as a mathematical proof based upon a prime-order cyclic group construction, for example, that is built using a standardized discrete logarithmic cryptographic group. The mathematical proof may be referred to herein as a presentation proof. The presentation proof, such as a membership proof or a non-membership proof, generally proves credential non-revocation by verifying that the user identifier $x_{id}$ is not accumulated in a blacklist representing revoked credentials or is accumulated in a whitelist representing valid credentials, without learning the user identifier $x_{id}$'s value.

Steps depicted in FIG. 4 commence at step 402 and proceed to step 404 when a credential is received accompanied by the proof of a credential within that credential. In addition to the credential and the presentation proof, the verifier accesses verifier-specific cryptographic data from a revocation authority in order to validate the credential's non-revocation status. The following represents one set of example input parameters when the revocation scheme is used in conjunction with a U-Prove cryptographic scheme:

Issuer parameter fields: IP=$UID_P$, desc($G_q$), $UID_\mathcal{H}$, ($g_0$, $g_1$, ..., $g_n$, $g_t$)

Ordered indices of disclosed attributes: D ⊂ {1, ..., n}
Ordered indices of undisclosed attributes: U={1, ..., n}−D
Ordered indices of committed attributes: C ⊂ U
U-Prove credential: $\mathcal{T}$=$UID_P$, h, TI, PI, $\sigma_z'$, $\sigma_c'$, $\sigma_r'$
Messages: m∈{0,1}*
Presentation proof: $\{A_i\}_{i \in D}$, a, $r_0$, $\{r_i\}_{i \in U}$, $\{(\tilde{c}_i, \tilde{a}_i, \tilde{r}_i)\}_{i \in C}$ c', r', $s_0$, ..., $s_4$, X, Y, R Accumulator public key pka=(q, $\mathcal{G}$, P, H, K, G)
The current accumulating value V When requesting access to a service provider, the provider running on the user's computing device presents the credential and the proof for credential verification. In one exemplary implementation, the service provider and the user negotiate which attributes to disclose before denying or granting access. The service provider, for instance, may insist on certain information, including credentials. The user and the service provider may decide that no attribute is to be disclosed in order to verify the credential in which instance the user employs an credential to validate the user's request.

Once received, the verifier performs a series of operations to verify the presentation proof in order to determine membership or non-membership in an accumulator. The following represents one example embodiment of such operations in which the accumulator corresponds to the blacklist.

Presentation Proof Verification
$x_t$:=ComputeXt(IP, TI)
For each i∈D, $x_i$:=ComputeXi(IP, $A_i$)
c:= $\mathcal{H}$(IP, $\mathcal{T}$, a, D, $\{x_i\}_{i \in D}$, C, $\{\tilde{c}_i\}_{i \in C}$, $\{\tilde{a}_i\}_{i \in C}$, m)
Verify that a= $\mathcal{H}((g_0 g_t^{x_t} \Pi_{i \in D} g_i^{x_i})^{-c} h^{r_0}(\Pi_{i \in U} g_i^{r_i}))$
For each i∈C, verify that $\tilde{a}_i = \mathcal{H}(\tilde{c}_i^c g_0^{r_i} g_1^{\tilde{r}_i})$ Compute
B:=$g^{s_0} g_1^{r'} \tilde{c}_{id}^{c'}$
$T_1$:=$G^{s_1} H^{s_2} R^{c'}$; $T_2$:=$G^{s_7} H^{s_4} R^{-s_0}$;
$T_3$:=$G^{s_6} H^{s_3} S^{c'}$; $T_4$:=$G^{-c'} H^{s_8} S^{-s_5}$;
$\Gamma$:=$X^{-s_0} H^{s_7} K^{s_1} P^{-s_5}(V^{-1}Y)^{c'}$
Verify that
c'=$_?$ $\mathcal{H}$(g, $g_1$, pka, $\tilde{c}_{id}$, B, X, Y, R, S, $T_1$, $T_2$, $T_3$, $T_4$, $\Gamma$)
Y=$_?$ $X^\delta$ Step 406 to step 410 refer at least some of these operations, but it is appreciated that these operations may be modified in other embodiments to achieve credential verification. Step 406 refers to computing discrete logarithmic cryptographic group based values using at least some proof components. Step 408 is directed towards comparing a hash value based upon a commitment value with an appropriate proof component. Step 410 illustrates application of a verifier-designated private cryptographic key and a cryptographic hash function to the presentation proof. Step 412 refers to determining membership or non-membership of the user identifier $x_{id}$ in a blacklist while step 414 refers to determining membership or non-membership of the user identifier $x_{id}$ in a whitelist. If the presentation proof includes a non-membership proof, the series of operations described above is executed.

On the other hand, if the presentation proof includes a membership proof, step 414 is executed instead of step 412, as represented by the following series of operations.

Presentation Proof Verification
$x_t$:=ComputeXt(IP, TI)
For each i∈D, $x_i$:=ComputeXi(IP, $A_i$)
c:= $\mathcal{H}$(IP, $\mathcal{T}$, a, D, $\{x_i\}_{i \in D}$, C, $\{\tilde{c}_i\}_{i \in C}$, $\{\tilde{a}_i\}_{i \in C}$, m)
Verify that a= $\mathcal{H}((g_0 g_t^{x_t} \Pi_{i \in D} g_i^{x_i})^{-c} h^{r_0}(\Pi_{i \in U} g_i^{r_i}))$
For each i∈C, verify that $\tilde{a}_i = \mathcal{H}(\tilde{c}_i^c g_0^{r_i} g_1^{\tilde{r}_i})$ Compute
B:=$g^{s_0} g_0^{r'} \tilde{c}_{id}^{c'}$
$T_1$:=$G^{s_1} H^{s_2} R^{c'}$; $T_2$:=$G^{s_3} H^{s_4} R^{-s_0}$
$\Gamma$:=$X^{-s_0} H^{s_3} K^{s_1}(V^{-1}Y)^{c'}$
Verify that
c'=$_?$ $\mathcal{H}$(g, $g_1$, pka, $\tilde{c}_{id}$, B, X, Y, R, $T_1$, $T_2$, $\Gamma$)
Y=$_?$ $X^\delta$ Step 416 represents a determination as to whether the credential is invalid or valid. According to one example implementation, if each and every proof component can be verified, the credential is valid because the credential user's identity has not been revoked and that user may be granted access to the service provider.

If the credential is revoked, step 418 illustrates denial of access to the user. If the credential is valid, step 420 illustrates granting of access to the user. Step 422 terminates execution of the example steps described for FIG. 4.

Figure 5:
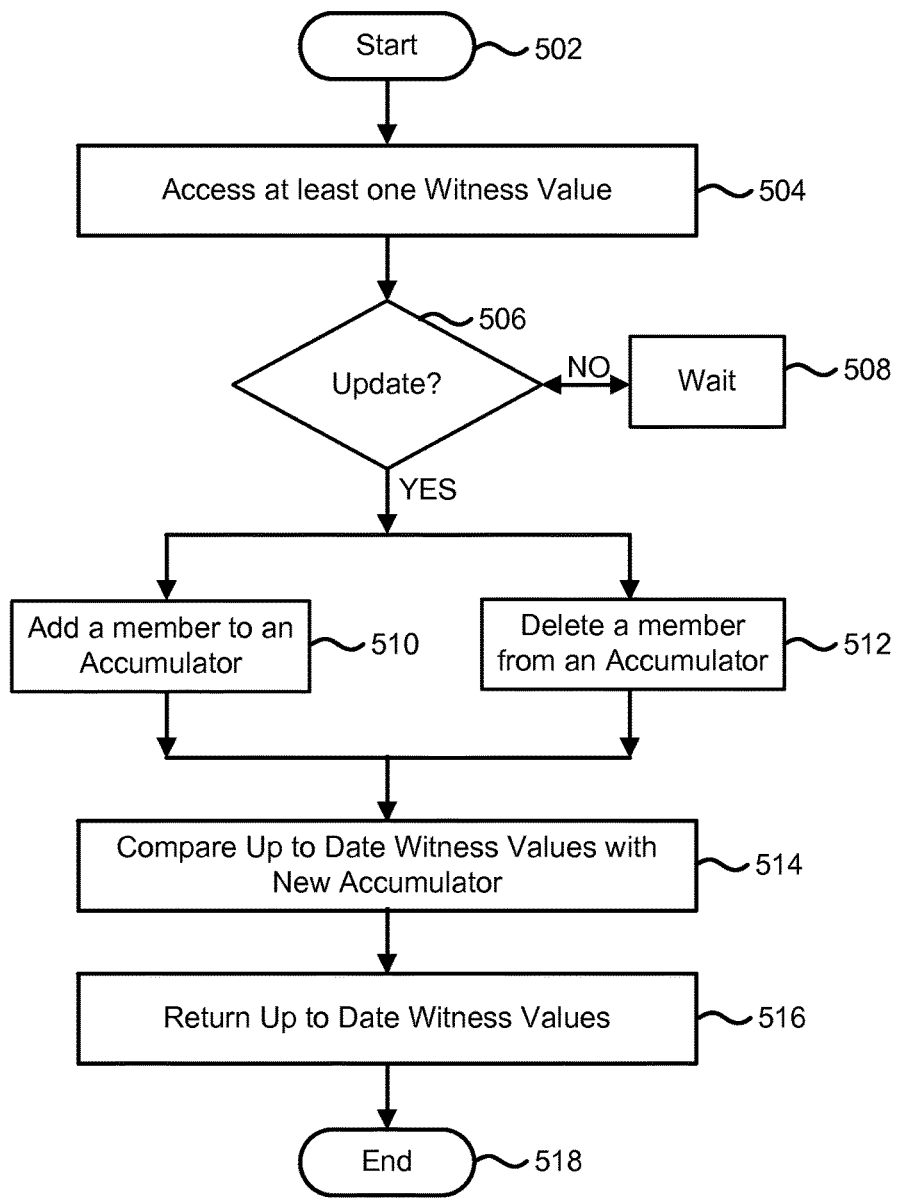
FIG. 5 is a flow diagram illustrating steps for updating at least one witness value according to one or more example implementations.

FIG. 5 is a flow diagram illustrating steps for updating at least one witness value according to one or more example implementations. Steps depicted in FIG. 5 commence at step 502 and proceed to step 504 when at least one witness value is accessed. In one implementation, the example steps are performed by various software and/or hardware, such as the revocation authority 212 of FIG. 2 as described herein.

Computation of at least one witness value utilizes the unique user identifier embedded as a revocation attribute within a credential, and an accumulator representing at least one revoked identifier or at least one valid identifier. In one implementation, the at least one credential is valid and the at least one user identifier is not accumulated in the blacklist. In another implementation, the at least one credential was pending while the user completed the transaction with a prior credential. Hence, the at least one credential is not valid. The authentication service revoked these credentials and accumulates the at least one user identifier and produce a new accumulator.

Step 506 represents a determination as to whether to update the at least one witness value in response to an accumulator member addition or member deletion. The accumulator may form a portion of a blacklist or a whitelist. If no such addition or deletion occurred, execution of these steps waits at step 508. Once such an addition or deletion occurs, the at least one witness value is updated to reflect a new accumulator. Step 510 represents implementations that add members to the accumulator and compute up to date witness values. Step 512 represents implementations that delete members from the accumulator and compute up to date witness values.

Step 514 represents a comparison of the at least one up to date witness values with the new accumulator. Step 514 is executed in order to verify that the at least one witness value complements the new accumulator and proves that a user identifier is not accumulated in the blacklist. This ensures a service provider that a credential is indeed valid. Alternatively, the at least one witness value proves that the user identifier is accumulated in the whitelist. Step 516 represents returning the up to date witness values to a user. Step 518 represents termination of the example steps.

Example Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 6:
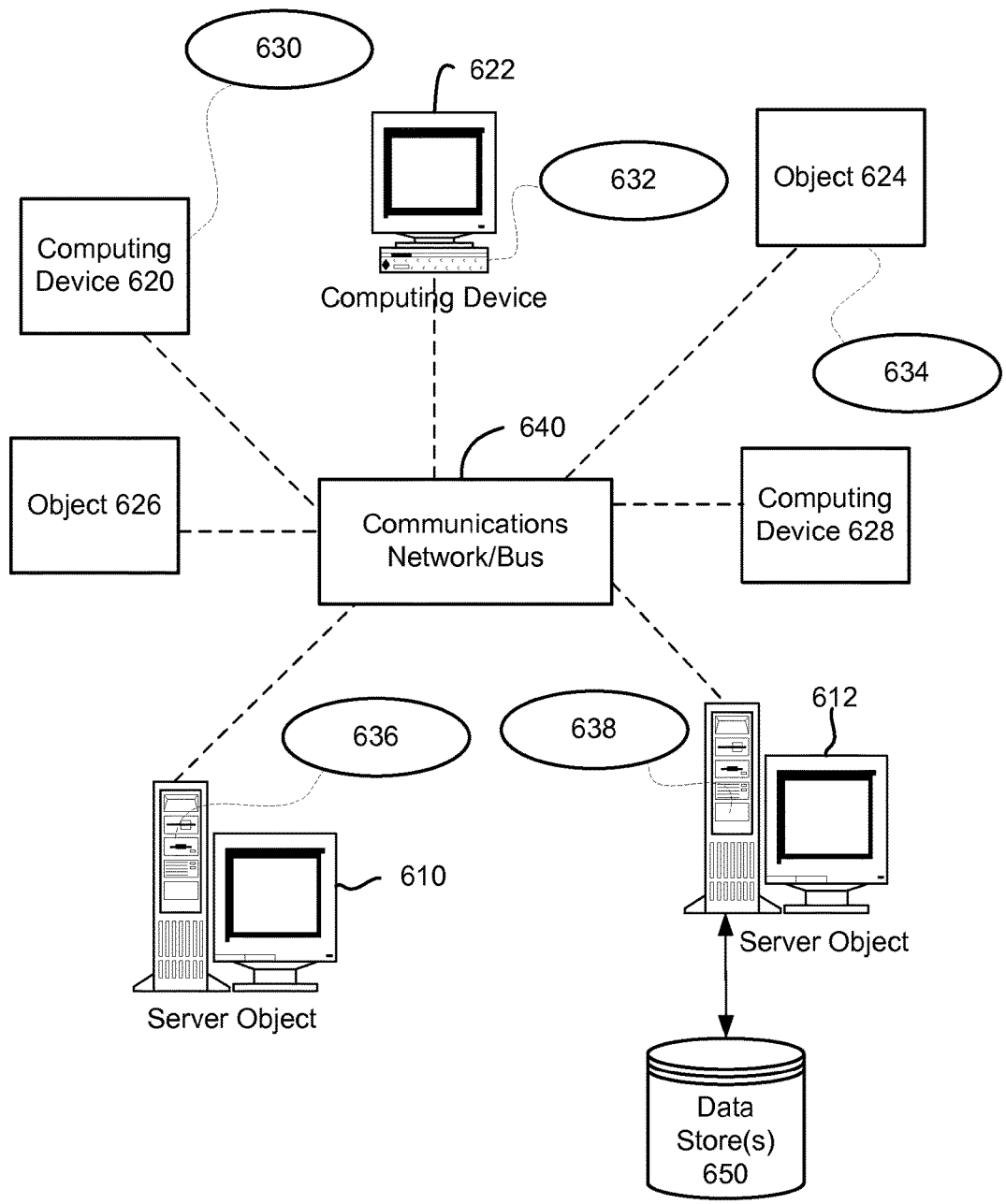
FIG. 6 is a block diagram representing example non-limiting networked environments in which various embodiments described herein can be implemented.

FIG. 6 provides a schematic diagram of an example networked or distributed computing environment. The distributed computing environment comprises computing objects 610, 612, etc., and computing objects or devices 620, 622, 624, 626, 628, etc., which may include programs, methods, data stores, programmable logic, etc. as represented by example applications 630, 632, 634, 636, 638. It can be appreciated that computing objects 610, 612, etc. and computing objects or devices 620, 622, 624, 626, 628, etc. may comprise different devices, such as personal digital assistants (PDAs), audio/video devices, mobile phones, MP3 players, personal computers, laptops, etc.

Each computing object 610, 612, etc. and computing objects or devices 620, 622, 624, 626, 628, etc. can communicate with one or more other computing objects 610, 612, etc. and computing objects or devices 620, 622, 624, 626, 628, etc. by way of the communications network 640, either directly or indirectly. Even though illustrated as a single element in FIG. 6, communications network 640 may comprise other computing objects and computing devices that provide services to the system of FIG. 6, and/or may represent multiple interconnected networks, which are not shown. Each computing object 610, 612, etc. or computing object or device 620, 622, 624, 626, 628, etc. can also contain an application, such as applications 630, 632, 634, 636, 638, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for example communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 6, as a non-limiting example, computing objects or devices 620, 622, 624, 626, 628, etc. can be thought of as clients and computing objects 610, 612, etc. can be thought of as servers where computing objects 610, 612, etc., acting as servers provide data services, such as receiving data from client computing objects or devices 620, 622, 624, 626, 628, etc., storing of data, processing of data, transmitting data to client computing objects or devices 620, 622, 624, 626, 628, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 640 or bus is the Internet, for example, the computing objects 610, 612, etc. can be Web servers with which other computing objects or devices 620, 622, 624, 626, 628, etc. communicate via any of a number of known protocols, such as the hypertext transfer protocol (HTTP). Computing objects 610, 612, etc. acting as servers may also serve as clients, e.g., computing objects or devices 620, 622, 624, 626, 628, etc., as may be characteristic of a distributed computing environment.

Example Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 7 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 7:
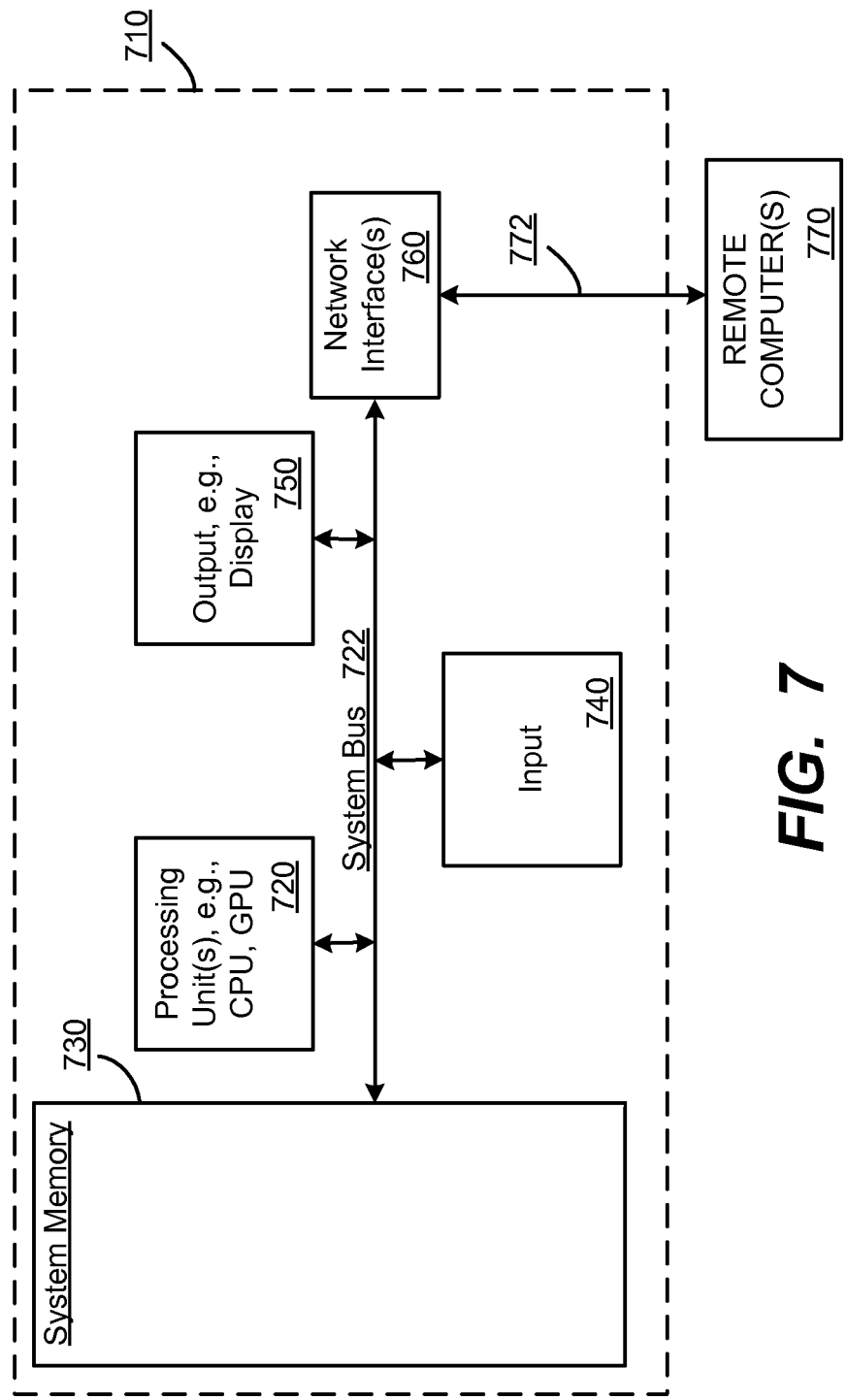
FIG. 7 is a block diagram representing an example non-limiting computing system or operating environment in which one or more aspects of various embodiments described herein can be implemented.

FIG. 7 thus illustrates an example of a suitable computing system environment 700 in which one or aspects of the embodiments described herein can be implemented, although as made clear above, the computing system environment 700 is only one example of a suitable computing environment and is not intended to suggest any limitation as to scope of use or functionality. In addition, the computing system environment 700 is not intended to be interpreted as having any dependency relating to any one or combination of components illustrated in the example computing system environment 700.

With reference to FIG. 7, an example remote device for implementing one or more embodiments includes a general purpose computing device in the form of a computer 710. Components of computer 710 may include, but are not limited to, a processing unit 720, a system memory 730, and a system bus 722 that couples various system components including the system memory to the processing unit 720.

Computer 710 typically includes a variety of computer readable media and can be any available media that can be accessed by computer 710. The system memory 730 may include computer storage media in the form of volatile and/or nonvolatile memory such as read only memory (ROM) and/or random access memory (RAM). By way of example, and not limitation, system memory 730 may also include an operating system, application programs, other program modules, and program data.

A user can enter commands and information into the computer 710 through input devices 740. A monitor or other type of display device is also connected to the system bus 722 via an interface, such as output interface 750. In addition to a monitor, computers can also include other peripheral output devices such as speakers and a printer, which may be connected through output interface 750.

The computer 710 may operate in a networked or distributed environment using logical connections to one or more other remote computers, such as remote computer 770. The remote computer 770 may be a personal computer, a server, a router, a network PC, a peer device or other common network node, or any other remote media consumption or transmission device, and may include any or all of the elements described above relative to the computer 710. The logical connections depicted in FIG. 7 include a network 772, such local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A computer-implemented method for execution by a verifier for a service provider, the method comprising:
   receiving from a computing device of a user a verification request for completing an electronic transaction with an online property included in the service provider;
   accessing a non-revocation component stored in the verification request and comprising a user identifier of the user, the non-revocation component corresponding to a minimal disclosure credential that is associated with identifying the computing device, the non-revocation component corresponding to a prime-order cryptographic group-based scheme including an accumulator computed using the user identifier, a verifier-designated cryptographic key corresponding to the verifier and at least one valid identifier or at least one revoked identifier, the user identifier being generated by a third party identity provider such that the user remains anonymous;
   granting or denying the electronic transaction by determining the user identifier's membership or non-membership in the accumulator based on applying the verifier-designated cryptographic key to the non-revocation component to verify that the non-revocation component is computed using the verifier-designated cryptographic key; and
   in response to determining that the minimal disclosure credential is a prior credential being used to complete the electronic transaction while another minimal disclosure credential associated with the computing device is a pending credential, updating the non-revocation component to revoke the minimal disclosure credential and the other minimal disclosure credential, and generating a new minimal disclosure credential associated with the computing device by accumulating at least the user identifier of the minimal disclosure credential into the accumulator.

2. The method of claim 1 further comprising validating a commitment for a revocation attribute corresponding to the user identifier.

3. The method of claim 1 further comprises if the user identifier is a member of the accumulator comprising the at least one valid identifier or if the user identifier is a non-member of the accumulator comprising the at least one revoked identifier, instructing the service provider to grant the verification request.

4. The method of claim 1 further comprises if the user identifier is a non-member of the accumulator comprising the at least one valid identifier or if the user identifier is a member of the accumulator comprising the at least one revoked identifier, instructing the service provider to deny the verification request.

5. The method of claim 1 further comprising generating a challenge based upon a prime-order cyclic group of the non-revocation component, processing a witness to an identifier and verifying non-revocation of the identifier based upon the witness and a commitment to the identifier that is computed using the challenge.

6. The method of claim 1, wherein applying the verifier-designated cryptographic key further comprises using a verifier-designated private key, based upon a discrete logarithmic group, to prove non-revocation of the minimal disclosure credential.

7. The method of claim 1, wherein applying the verifier-designated cryptographic key further comprises verifying a presentation proof generated for the minimal disclosure credential by using a prime-order cyclic subgroup construction or an elliptical curve construction of the prime-order cryptographic group to compute mathematical numbers for comparison with components of the presentation proof.

8. The method of claim 1, wherein applying the verifier-designated cryptographic key further comprises generating the verifier-designated cryptographic key using a standardized cryptographic group, and applying the verifier-designated cryptographic key to the non-revocation component to determine validity of the minimal disclosure credential.

9. The method of claim 1 further comprising generating a public cryptographic key and a private cryptographic key from a prime-order cyclic subgroup or elliptic curve.

10. An apparatus implemented in hardware comprising:
    a verifier comprising logic stored in hardware memory and executed on a logic circuit, the verifier being operative to:
       receive from a computing device of a user a verification request for completing an electronic transaction with an online property included in a service provider;
       access a non-revocation component stored in the verification request and comprising a user identifier of the user, the non-revocation component corresponding to a minimal disclosure credential that is associated with identifying the computing device, the non-revocation component corresponding to a prime-order cryptographic group-based scheme including an accumulator computed using the user identifier, a verifier-designated cryptographic key corresponding to the verifier and at least one valid identifier or at least one revoked identifier, the user identifier being generated, by a third party identity provider, such that the user remains anonymous;

grant or deny the electronic transaction by determining the user identifier's membership or non-membership in the accumulator based on applying the verifier-designated cryptographic key to the non-revocation component to verify that the non-revocation component is computed using the verifier-designated cryptographic key; and in response to determining that the minimal disclosure credential is a prior credential being used to complete the electronic transaction while another minimal disclosure credential associated with the computing device is a pending credential, update the non-revocation component to revoke the minimal disclosure credential and the other minimal disclosure credential, and generate a new minimal disclosure credential associated with the computing device by accumulating at least the user identifier of the minimal disclosure credential into the accumulator.

11. The apparatus of claim 10, the verifier being further operative to validate a commitment for a revocation attribute corresponding to a user identifier.

12. The apparatus of claim 10, the verifier being further operative to instruct the service provider to grant the verification request if the user identifier is a member of the accumulator comprising the at least one valid identifier or if the user identifier is a non-member of the accumulator comprising the at least one revoked identifier.

13. The apparatus of claim 10, the verifier being further operative to instruct the service provider to deny the verification request if the user identifier is a non-member of the accumulator comprising the at least one valid identifier or if the user identifier is a member of the accumulator comprising the at least one revoked identifier.

14. The apparatus of claim 10, the verifier being further operative to generate a challenge based upon a prime-order cyclic group of the non-revocation component, processing a witness to an identifier and verify non-revocation of the identifier based upon the witness and a commitment to the identifier that is computed using the challenge.

15. The apparatus of claim 10, wherein applying the verifier-designated cryptographic key includes the verifier being further operative to use a verifier-designated private key, based upon a discrete logarithmic group, to prove non-revocation of the minimal disclosure credential.

16. The apparatus of claim 10, wherein applying the verifier-designated cryptographic key includes the verifier being further operative to verify a presentation proof generated for the minimal disclosure credential by using a prime-order cyclic subgroup construction or an elliptical curve construction of the prime-order cryptographic group to compute mathematical numbers for comparison with components of the presentation proof.

17. The apparatus of claim 10, wherein applying the verifier-designated cryptographic key includes the verifier being further operative to generate the verifier-designated cryptographic key using a standardized cryptographic group, and applying the verifier-designated cryptographic key to the non-revocation component to determine validity of the minimal disclosure credential.

18. The apparatus of claim 10, the verifier being further operative to generate a public cryptographic key and a private cryptographic key from a prime-order cyclic subgroup or elliptic curve.

19. Computer-readable storage hardware having computer-executable instructions, which when executed, cause a computer to perform steps, comprising:

receiving from a computing device of a user a verification request for completing an electronic transaction with an online property included in a service provider;

accessing a non-revocation component stored in the verification request and comprising a user identifier of the user, the non-revocation component corresponding to a minimal disclosure credential that is associated with identifying the computing device, the non-revocation component corresponding to a prime-order cryptographic group-based scheme including an accumulator computed using the user identifier, a verifier-designated cryptographic key corresponding to the verifier and at least one valid identifier or at least one revoked identifier, the user identifier being generated, by a third party identity provider, such that the user remains anonymous;

granting or denying the electronic transaction by determining the user identifier's membership or non-membership in the accumulator based on applying the verifier-designated cryptographic key to the non-revocation component to verify that the non-revocation component is computed using the verifier-designated cryptographic key; and in response to determining that the minimal disclosure credential is a prior credential being used to complete the electronic transaction while another minimal disclosure credential associated with the computing device is a pending credential, updating the non-revocation component to revoke the minimal disclosure credential and the other minimal disclosure credential, and generating a new minimal disclosure credential associated with the computing device by accumulating at least the user identifier of the minimal disclosure credential into the accumulator.

20. The computer-readable storage hardware of claim 19 having further computer-executable instructions comprising:

instructing the service provider to deny the verification request if the user identifier is a non-member of the accumulator comprising the at least one valid identifier or if the user identifier is a member of the accumulator comprising the at least one revoked identifier, or instructing the service provider to grant the verification request if the user identifier is a member of the accumulator comprising the at least one valid identifier or if the user identifier is a non-member of the accumulator comprising the at least one revoked identifier.

* * * * *